US008035551B1

United States Patent
Govoni

(10) Patent No.: US 8,035,551 B1
(45) Date of Patent: Oct. 11, 2011

(54) NOISE CORRELATION RADAR DEVICES AND METHODS FOR DETECTING TARGETS WITH NOISE CORRELATION RADAR

(75) Inventor: Mark A. Govoni, Abingdon, NJ (US)

(73) Assignee: The United States of America as represented by the Secretary of the Army, Washington, DC (US)

(*) Notice: Subject to any disclaimer, the term of this patent is extended or adjusted under 35 U.S.C. 154(b) by 24 days.

(21) Appl. No.: 12/655,688

(22) Filed: Dec. 2, 2009

Related U.S. Application Data

(63) Continuation-in-part of application No. 12/214,302, filed on Jun. 5, 2008, now abandoned.

(51) Int. Cl.
*G01S 7/292* (2006.01)

(52) U.S. Cl. ........ 342/189; 342/196; 342/132; 342/134; 342/135; 342/159; 342/162

(58) Field of Classification Search .......... 342/189, 342/196, 131, 132, 134, 135, 159–162
See application file for complete search history.

(56) References Cited

U.S. PATENT DOCUMENTS

| | | | |
|---|---|---|---|
| 5,440,311 A * | 8/1995 | Gallagher et al. | 342/132 |
| 5,463,399 A * | 10/1995 | Kretschmer, Jr. | 342/132 |
| 5,568,150 A * | 10/1996 | Taylor et al. | 342/189 |
| 5,724,041 A | 3/1998 | Inoue et al. | |
| 5,831,570 A * | 11/1998 | Ammar et al. | 342/26 B |
| 6,031,485 A | 2/2000 | Cellai et al. | |
| 6,208,285 B1 * | 3/2001 | Burkhardt | 342/132 |
| 6,462,705 B1 | 10/2002 | McEwan | |
| 6,989,782 B2 * | 1/2006 | Walker et al. | 342/134 |
| 7,002,511 B1 * | 2/2006 | Ammar et al. | 342/134 |
| 7,289,060 B1 * | 10/2007 | Abatzoglou et al. | 342/90 |
| 7,486,229 B1 * | 2/2009 | Govoni | 342/165 |
| 7,948,429 B2 * | 5/2011 | Drake et al. | 342/26 R |
| 2005/0068226 A1 * | 3/2005 | Shinonaga et al. | 342/134 |
| 2005/0179585 A1 * | 8/2005 | Walker et al. | 342/134 |
| 2008/0042895 A1 * | 2/2008 | Inaba | 342/112 |

* cited by examiner

*Primary Examiner* — John Sotomayor
(74) *Attorney, Agent, or Firm* — Michael Zelenka; Stephen J. Harbulak

(57) ABSTRACT

A pulsed compression noise correlation radar uses noise modulation and pulse compression technology to scramble recognizable transmit signal characteristics and reduce transmit energy. The pulsed noise correlation radar advantageously uses pulse compression technology, a pulsed linear frequency modulated noise correlation mixer, and a new and innovative noise fused waveform to automatically correlate the pulsed linear frequency modulated (LFM) noise waveform with the received signal. The pulsed noise correlation radar apparatus and system now make it possible to effectively reduce transmitting power, preserve high band widths through oversampling in the receiver, and achieve multichannel array frequency diversity. A secure pulsed compression noise correlation radar system and methods for undetected target detection with pulsed noise correlation radar and a pulsed LFM fused noise waveform are also provided.

22 Claims, 16 Drawing Sheets

NOISE CORRELATION RADAR DEVICES AND METHODS FOR DETECTING TARGETS WITH NOISE CORRELATION RADAR

This is a Continuation-in-part application of U.S. patent Office application Ser. No. 12/214,302, entitled "NOISE CORRELATION RADAR DEVICES AND METHODS FOR DETECTING TARGETS WITH NOISE CORRELATION RADAR," filed by the same inventor on Jun. 5, 2008 and which is about to be abandoned.

GOVERNMENT INTEREST

The invention described herein may be manufactured, used and licensed by or for the Government of the United States of America without the payment by the Government of any royalties thereon.

FIELD OF THE INVENTION

The present invention pertains generally to radar systems and methods. More particularly, the present invention pertains to surveillance target detection with noise correlation radar.

BACKGROUND OF THE INVENTION

Radar has a long history of use for military and law enforcement target detection. Due to the very nature of many military and law enforcement missions, the radar user may frequently be exposed to dangerous conditions. There are two types of conventional noise radar systems that are currently available and widely used. One is the ultra wideband band (UWB) noise radar, and the other type is the pulsed noise radar. Each type of radar offers different advantages.

To date, there has been extensive developmental work done with the random signal, UWB, and pulsed waveforms, and each waveform provides certain performance advantages, but they also suffer from a number of drawbacks, disadvantages, and limitations of their waveform characteristics.

The main advantage with the random signal waveform is that this waveform masks its modulated signal characteristics with noise characteristics so that the signal seems to be a channel that is common to all communications systems. Of course, the modulated signal also has a specific structure that can only be deciphered by its intended receiver.

In general, noise radar possess an inherently non-deterministic signal structure that affords a certain level of protection against non-intended, second party receivers. Furthermore, using UWB technology with noise radar offers additional levels of protection since users of such systems can reduce the overall transmit energy during radiation intervals. UWB noise radar requires optical delay lines or matched-filter banks to laboriously assess the presence of a target in each range gate, which is a very time-consuming and cumbersome process that can lead to stale target information.

The UWB waveform also suffers from a few disadvantages and shortcomings. For example, a large number of the UWB noise radar systems implement a linear frequency modulated continuous wave transmit signal. In its most primitive form, a continuous wave signal can be represented by a pure sinusoid, which, when transformed in the frequency domain, results in a discrete frequency response centered about its carrier frequency. However, centering the response on the carrier frequency sacrifices a high resolution capability, which oftentimes results in the inability to resolve reflected signal components subject to channel fading, and so on. Other difficulties with the continuous wave signal are the complex hardware requirements associated with transmit/receive isolation and separate transmit-receive entities, the need for phase detectors to extract the target range, and the inability to use a multi-channel array. Similarly, the pulsed waveform also suffers from the fact that they impose a high transmit power requirement on their amplifiers. This suggests that more expensive, stable amplifiers are mandatory in order for pulsed waveform implementations to work properly.

Moreover, the typical military and law enforcement mission frequently includes critical security and surveillance requirements that can make unwanted detection both undesirable and dangerous, and the prior art radar arrangements oftentimes fail to satisfy those critical requirements. Thus there has been a long-felt need for a radar signal generation apparatus that overcomes the extensive, costly, and time-consuming hardware disadvantages of prior art systems such as optical delay lines and matched-filter banks, as well as the waveform shortcomings of centering the carrier frequency response and the risks of unwanted detection during extended range surveillance operations.

The concept of noise radar was first introduced in the 1950s by B. M. Horton where challenges surrounding his proposal were predominately due to hardware requirements needed for such a system to work affectively [1]. Due to modem hardware advances, the novelty of noise radar has begun to generate some recent interest. In fact, there has been a reemergence in research focused on using noise as an RF source. Narayanan et al., for example, designed and tested an ultra wideband (UWB) random noise radar (RNR) operating in the 1-2 GHz band at 200 meters in range. Results from this work established a solid basis for the feasibility of using noise as an RF source for the purposes of detecting targets [2]-[6]. Extensive work conducted by the Nanjing University (China) resulted in conclusive analysis describing an ideal waveform hybrid made up of UWB and random signal radar (RSR) waveforms where the authors determined that the best way to achieve a low probability of intercept/low probability of detect (LPIILPD) system with low power and high resolution would be to combine these two waveforms [7]-[9]. The Russian Academy of Sciences has done extensive exploration on the plausibility of using code spectral modulation for communications systems, a technique first introduced in 1965 by J. L. Poirier [10], in order to insert data onto a random signal carrier where the concept of double spectral processing is exercised to extract the time delay corresponding to the information symbol [11]. Despite the availability of noise radar technology, the broader radar community has not yet fully embraced its attributes. The productivity of this work hopes to shorten this gap. This research is motivated by the belief that a strong majority of conventional radar systems transmit energy openly. This implies an obvious susceptibility to some advanced, non-intended 2nd party passive receivers who might have an interest in understanding what the unsecured RF source's intentions are. It was therefore felt that some research in this area could serve as a means to suggest one possible solution for addressing this concern. It was also felt that the productivity of the research should appreciate two fundamental criteria: a) the proposed waveform should not impede the radar's primary functions e.g. target detection, terrain mapping, and b) the scope of incorporating the proposed waveform should be done with marginal impact to the host waveform structure.

Due to the nature of noise, both its time and frequency domain responses are random making it virtually impossible for the transmitted signal to be recognized and/or corrupted by non-intended 2nd party passive receivers without having a priori knowledge of the exact structure of the noise signal. However, transmitting noise alone is insignificant unless a carrier signal of specific frequency and phase is used as a reference. One practical approach is to do as Narayanan et al. did and artificially inject time-delayed replicas of the signal into the processing side of the system architecture. This was done in an effort to institute some form of coherence into their waveform while also reducing the overall computational complexity involved with signal processing. By selectively choosing specific time-delays, they in essence only needed to consider the presence of targets at certain ranges. As a result, when the radar returns were present in the candidate range bins, a well correlated signal would result. While what Narayanan et al. performed proved to be quite useful for the noise radar community, their approach only considered a short range test (<<10 m) and a longer range test (200 m). Furthermore, their experimental set up suggests that specific hardware needs to be incorporated in order to successfully implement a UWB random noise radar. Because a majority of radar in use today implements a pulse-Doppler waveform structure, Narayanan's approach would impose a drastic impact to the architecture of these types of systems. These points clearly violate the fundamental criteria set forth earlier.

For these reasons, we consider herein a different noise radar approach that employs a composite waveform generated by amplitude modulating a complex pulse-Doppler waveform using noise. This waveform will serve as the basis for the inception of a newly defined noise radar class referred to by the authors as Noise Correlation Radar (NCR). It distinguishes itself from its peers, namely RNR and RSR, since neither a pure noise signal nor a modulated noise signal is transmitted. Instead, a pulse-Doppler waveform using pulse compression and linear frequency modulation (LFM) techniques serves as the host or modulated waveform. The LFM provides the coherence needed for proper correlation during the signal processing as well as the bandwidth necessary for resolving targets. It will be shown that the noise modulated pulse-Doppler waveform embodies the ideal characteristics of both noise radar and pulse-Doppler radar waveform in that it will have a chirped bandwidth (BW), pulse compression gain, masked transmit spectrum, and ideal ambiguity function. Notably, these facts appeal to many radar applications.

SUMMARY OF THE INVENTION

In order to overcome the disadvantages, shortcomings and limitations of prior art radar target detection, such as costly and sluggish hardware, waveform disadvantages such as centering the carrier frequency response, increasing the probability of detection, and the life-threatening risks of unwanted detection, the pulsed noise correlation radar apparatus of the present invention advantageously uses pulse compression technology, a pulsed linear frequency modulated noise correlation mixer, and a new and innovative noise fused waveform to automatically correlate the pulsed linear frequency modulated noise waveform with the received signal. This eliminates the need for injecting a delayed reference signal correlation. This invention's pulsed noise correlation radar apparatus and system now make it possible to effectively reduce transmitting power, preserve high band widths through oversampling in the receiver, and achieve multi-channel array frequency diversity. This invention's pulsed compression waveform structure with correlated noise radar offers designers and users the choice of reducing processing burdens on system hardware while still preserving the random signal structure and its associated amenities. One essential difference between the prior art and this invention's noise correlation radar is this invention's unique fused waveform, particularly, the linear frequency modulation which allows the pulsed noise correlation radar to take advantage of correlation mixing that allows it to optimally and efficiently detect targets.

Accordingly, it is an object of the present invention to provide a pulsed noise correlation radar apparatus.

It is another object of the present invention to provide a pulsed noise correlation radar apparatus that generates a pulsed linear frequency modulated noise fused waveform.

It is still a further object of the present invention to provide methods of detecting targets with pulsed noise correlation radar apparatus that generates a pulsed linear frequency modulated noise fused waveform.

These and other objects and advantages are achieved by this invention's pulsed noise correlation radar apparatus comprising a Gaussian noise signal generator, a frequency modulator generating a pulse train and linear frequency modulated (LFM) noise waveform, a means for sensing targets, a frequency demodulator, and a Transform of a correlated signal y(t) that generates a $Y(j\omega)$ signal, calculates power spectral density $S_{yy}(j\omega)$ and generates a pulse compression LFM waveform. Preferably a Fast Fourier Transform can be used according to one embodiment of the invention. The pulse compression LFM noise waveform generated by the pulsed noise correlation radar apparatus rapidly increases its carrier frequency, achieves instantaneous band widths, and better detects a target without being intercepted or detected. Unlike the prior art's cumbersome and time-consuming use of optical delay lines or matched-filter banks, this invention's unique pulsed fused LFM noise waveform uses correlation mixing to optimally and more efficiently detect targets.

The present invention takes advantage of several aspects of pulsed signals to substantially improve radar target detection in military surveillance systems focused on detecting single or multiple targets at extended ranges. The fact that the waveform is pulsed allows the timing control associated with the transmission of successive, coherent pulses to be managed and maintained thereby reducing any isolation faults between the transmission and the reception process. As a result, the same antenna phase center can be used, which makes potential hardware implementations more practical. Furthermore, this synchronization allows for a ranging capability that can be directly defined by the equation:

$$R_u = c(T/2) \hspace{2cm} \text{Equation (1)}$$

where $R_u$ is the unambiguous range, c is the speed of light, and T is the pulse repetition interval.

Equation (1) makes it clear that when a target is present, a delay will naturally manifest itself in the returned signal structure. Furthermore, pulsed signals are able to incorporate pulse compression techniques thereby minimizing the burden on the transmitter/receiver when trying to realize high bandwidth, and their associated narrow pulse widths, for high resolution applications. Pulse compression also maximizes the transmit duty factor keeping the effective radiated power low, as one would expect with a fundamental UWB signal. Lastly, because the pulsed LFM noise transmit signal is stored as a reference, the correlation mixer can be incorporated into the receive side in order to resolve discrete frequency responses induced by the time dilation effect caused by the target's scintillation (reflection, refraction, diffraction) thereby eliminating the need to inject a delayed reference signal through the use of an optical delay line.

It is important to note that the pulsed noise correlation radar and its unique pulsed LFM fused noise waveform exhibit an extremely low probability of being intercepted and a low probability of detection that is highly desired in numerous military and commercial applications. Furthermore, because of the ultra-wide band characteristics of the waveform, the receiver will be practically immune to interference and channel fading typically associated with narrow band signals. Since a pulsed signal is generated, the designer may also introduce frequency diversity with a multi-channel array thereby introducing spatial and temporal degrees of freedom exponentially more powerful than a single phase antenna.

This invention provides a pulsed noise correlation radar apparatus that answers the long-felt need for a pulse compression radar system to overcome the disadvantages, shortcomings, and limitations of prior art radar systems. In accordance with the present invention, both radar target acquisition and high bandwidths are preserved through oversampling, multi-channel array frequency diversity, and substantially increased user security without suffering from the disadvantages, shortcomings, and limitations of prior art devices. The present invention also encompasses a secure pulsed compression noise correlation radar system and methods for undetected target detection with pulsed noise correlation radar and a pulsed LFM fused noise waveform.

BRIEF DESCRIPTION OF THE DRAWINGS

These and other features and advantages of the present invention will become more apparent from the following detailed description in conjunction with the appended drawings in which.

DETAILED DESCRIPTION OF THE INVENTION

The present invention is a pulsed noise correlation radar target detection apparatus that advantageously detects stationary and moving targets by generating a pulsed linear frequency modulated (LFM) noise fused waveform with the ability to linearly increase carrier frequency to realize specific instantaneous band widths. In accordance with the present invention, the pulsed compression noise correlation radar generates a pulse train modulating the signal $s(t)$ to arrive at a pulsed LFM fused noise waveform signal $x(t)$, which is then demodulated and generates the correlated signal $y(t)$. This invention's pulsed noise correlation radar effectively reduces transmit power, preserves high bandwidths by oversampling, introduces frequency diversity with a multi-channel array, and provides the user with increased security and surveillance capability.

Not only does this invention's pulsed noise correlation radar resolve many long-standing problems with prior art radar arrangements, but it also provides much-needed additional capabilities of storing the pulsed LFM noise transmit signal as a reference and operates in a way that minimizes or completely avoids unwanted detection by an adversary. Storing the pulsed LFM noise transmit signal as a reference allows the user to automatically correlate the transmit signal with the received signal and thereby eliminate the need for injecting a delayed reference signal. And, this invention's use of wide-sense stationary Gaussian noise and pulse compression techniques, effectively reduces the transmit power spectrum and removes any chirp-like characteristics from the waveform that might be intercepted by an unwanted adversary receiver. Another advantage of the present invention is to realize large instantaneous bandwidths during reception which permit the user to resolve targets despite interference and additive white Gaussian noise.

Figure 1:
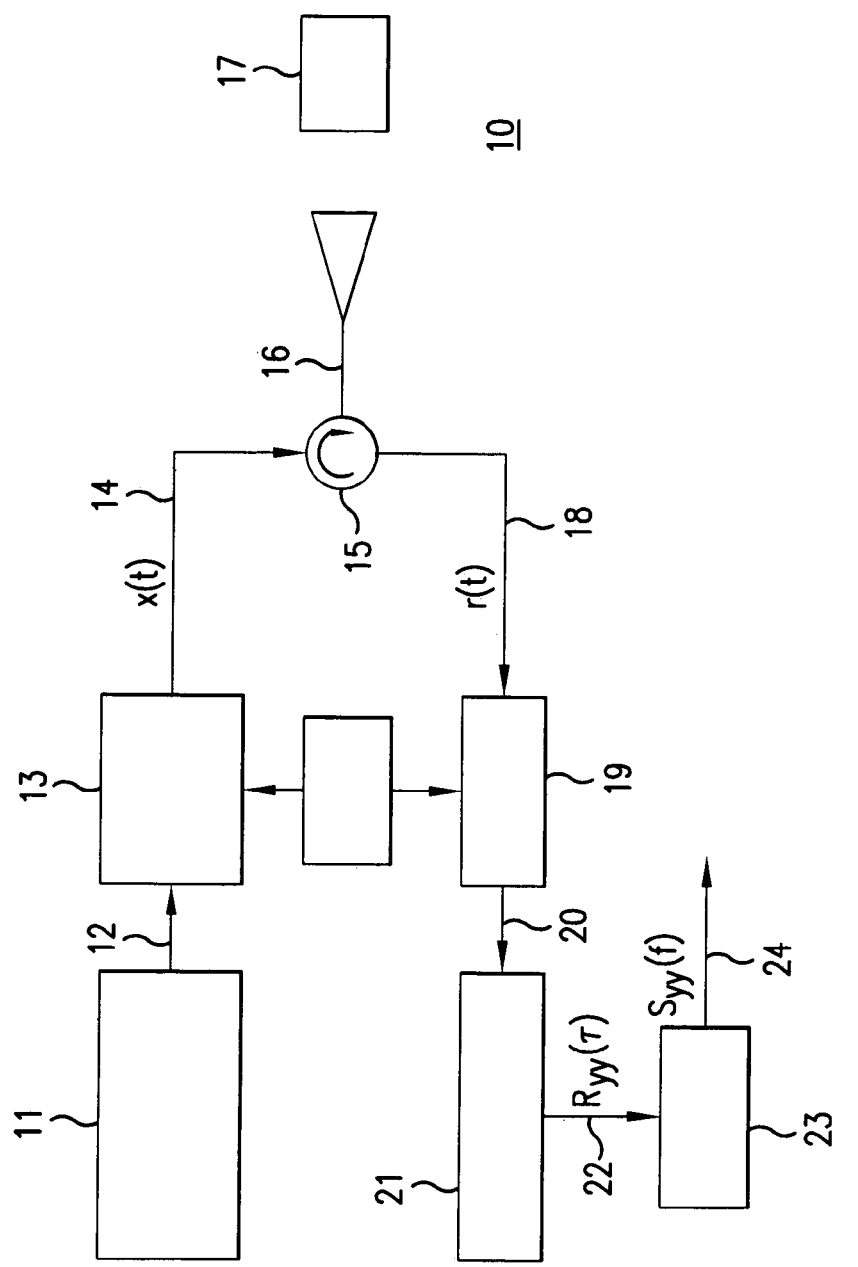
FIG. 1 is a conceptual flow diagram of the present invention.

Referring now to the drawings, FIG. 1 is a conceptual diagram of the pulsed noise correlation radar 10 of the present invention which overcomes the disadvantages, shortcomings, and limitations of prior art radar systems. The pulsed noise correlation radar 10 comprises a wide sense stationary Gaussian noise signal generator 11, a means for generating a pulse train 13, a pulsed LFM fused noise waveform 14, a frequency demodulator 19, a means for correlating 21, and a Fast Fourier Transform 23 by advantageously generating a pulsed LFM fused noise waveform and auto-correlated signals that provide superior target detection without the dangers of emitting an electronic signature.

The wide sense stationary Gaussian noise signal generator 11 generates a Gaussian noise signal, indicated by arrow 12 to provide a normally distributed probability density function and that is also wide sense stationary. A means for generating a pulse train 13 generates an LFM waveform with the ability to linearly ramp up its carrier frequency in order to realize specific instantaneous band widths. The pulse train generating means 13 combines the Gaussian noise signal 12 and LFM waveform and provides an LFM noise waveform s(t). The pulse train generating means 13 generates a pulse train modulating the signal s(t) and provides a pulsed LFM fused noise waveform x(t), indicated by arrow 14. The noise modulation aspects of this invention scramble any recognizable transmit signal characteristics and also reduce transmit energy. The pulse train generating means 13 can be a frequency modulator.

A means for sensing targets 15 sends a signal 16 to the target, indicated by box 17, which generates a range and radar cross section of targets. A received signal r(t), indicated by arrow 18, is received by a frequency demodulator 19. The frequency demodulator 19, having a means for calculations, calculates the time dilation effect induced by target scintillation and includes this effect in the time dilated received signal r(t), indicated by arrow 20. The time dilated received signal r(t) 20 is sent to a means for correlation mixing 21 that advantageously exploits the time dilation effects induced by target scintillation.

In accordance with the present invention, the correlation mixing means 21 integrates the product over time of the transmitted signal x(t) and the conjugate of the time dilated received signal r*(t), which is denoted by the asterisk in Equation (7) below to provide an auto-correlated signal $R_{yy}(\tau)$, indicated by arrow 22. The Fast Fourier Transform 23 converts the auto-correlated signal, $R_{yy}(\tau)$, 22 into a transformed auto-correlated signal, represented by arrow 24, having a power spectral density denoted by the expression $S_{yy}(f)$. The transformed auto-correlated signal 24 presents discrete frequencies that correspond to the target i.e. $f_{tgt}=\mu \cdot \tau_{tgt}$, allowing the user to advantageously detect the target with reduced transmit power and without being intercepted and emitting a detectable electronic signature.

In operation, the noise modulation aspects of this invention scramble any recognizable transmit signal characteristics and also reduce transmit energy to prevent interference and allow the user to avoid unwanted detection by not emitting a detectable electronic signature. Additionally, the Fast Fourier Transform 23 mathematically removes all of the temporal content in a particular signal of interest by integrating over a finite interval of existence. The result is a function of frequency only. In accordance with the present invention, the Fast Fourier Transform 23 identifies strong frequency content associated with target delays so that the user can detect both moving and stationary targets without being intercepted and emitting a detectable electronic signature. Although a Fast Fourier Transform is preferred, other transforms can be utilized.

The following equations define several key elements of the elements of this invention. The pulsed LFM fused noise waveform 14 is defined by the following equations as:

$$x(t) = \sum_{n=1}^{N} v(t) \cdot s(t-nT) \quad \text{Equation (2)}$$

where T is the PRI, n is the number of pulses, and $$s(t) = \exp\left(-j2\pi\left\{f_i t + \frac{\mu}{2}t^2\right\}\right) \quad \text{Equation (3)}$$

where v(t) represents the WSS Gaussian noise signal, $f_i$ is the initial chirp frequency, and $\mu$ is the LFM coefficient.

The time dilated received signal r(t) 20, which includes the time dilation effect induced by target scintillation, is defined as:

$$r(t) = \sum_{n=1}^{N} v'(t) \cdot d(t-nT) + \gamma(t) \quad \text{Equation (4)}$$

where $$d(t) = \exp\left(-j2\pi\left\{f_i(t-\tau_{tgt}) + \frac{\mu}{2}(t-\tau_{tgt})^2\right\}\right) \quad \text{Equation (5)}$$

where v'(t) is the received Gaussian amplitude, $\tau_{tgt}$ is the time dilation associated with the target, and $\gamma(t)$ is additive white Gaussian noise (AWGN).

The auto-correlated signal 24 is defined as:

$$S_{yy}(f) = \int_{-\infty}^{\infty} R_{yy}(\tau) \cdot e^{-j\omega\tau} d\tau \quad \text{Equation (6)}$$

where $$R_{yy}(\tau) = \int x(t) \cdot r^*(t-\tau) dt \quad \text{Equation (7)}$$

and $R_{yy}(\tau)$ is the auto-correlated signal.

The operation of this invention's pulsed noise correlation radar 10 has been simulated in the laboratory using the MATLAB computer program with the following radar parameters:

Carrier frequency ($f_c$=10 GHz)
Unambiguous range ($R_u$=30 km)
PRI=200 μsec, PRF=5000 Hz
Number of pulses ($N_P$=16)
Duty factor ($d_f$=30%)
Transmit pulse width ($\tau_{tx}$=60 μsec)
CPI=3.2 msec
Receive band width ($BW_{rx}$=[15, 30, 150] MHz)

Initial chirp frequency ($f_i = f_c - BW_{rw}/2$ Hz)
Final chirp frequency ($f_f = f_c + BW_{rx}/2$ Hz)
Resolution (res=[10.0, 5.0, 1.0]) m
Receive pulse width ($\tau_{rx} = BW_{rx}^{-1}$) sec
Pulse compression ratio ($\xi = \tau_{tx} \cdot BW_{rx}$)
Number of FFT ($N_{FFT} = 2^{\lceil log_2(\xi) \rceil}$)
Frequency resolution ($\Delta_f = \tau_{tx}^{-1}$) Hz
LFM coefficient ($\mu = BW_{rx}/\tau_{tx}$) 1/sec²
Sampling frequency ($f_s = \Delta_f \cdot N_{FFT}$) Hz
Fast time (t=[0:1/$f_s$:PRI]) sec
Slow time (T=[0:PRI:CPI]) sec
Number of targets ($n_{tgt}=3$)
RCS=[5, 10, 12] m²
Range to targets ($R_{tgt}$=[8, 8.25, 19]) km The results of this simulation are depicted in FIGS. 2-7 and illustrate the performance of the pulsed noise correlation radar 10 by showing its ability to detect targets amidst interference and noise. Also shown, the transmit spectrum of the pulsed noise correlation radar 10 clearly shows a random nature as expected. This is a distinguishing feature over the current conventional implementations which have a well-defined characteristic that is easily associated with its waveform type.

Figure 2:
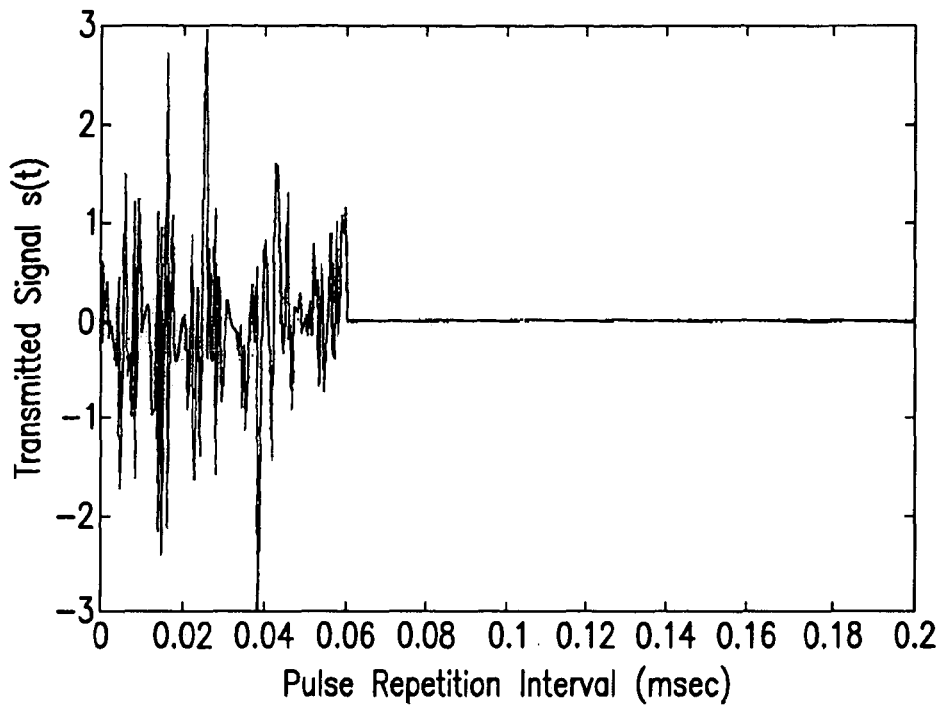
FIG. 2 is a chart plotting the $Re\{x(t)\}$ response of the transmitted pulse train during the first pulse repetition interval.
Figure 3:
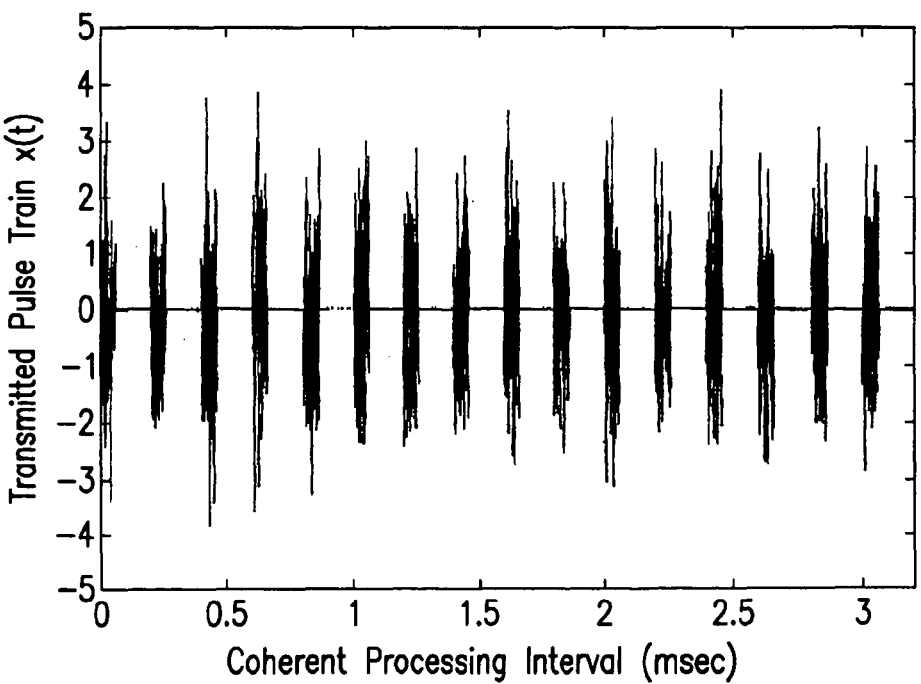
FIG. 3 is a chart plotting the $Re\{x(t)\}$ response of the coherently transmitted pulse train for the entire coherent processing interval.

FIG. 2 is a chart plotting the Re{x(t)} response of the transmitted pulse train during the first pulse repetition interval and FIG. 3 is a chart plotting the Re{x(t)} response of the coherently transmitted pulse train for the entire coherent processing interval (CPI). Taken together, FIGS. 2 and 3 illustrate the fact that the pulsed noise correlation radar 10 is indeed a periodic, pulsed structure modulated by a random signal, and was modeled as such.

Figure 4:
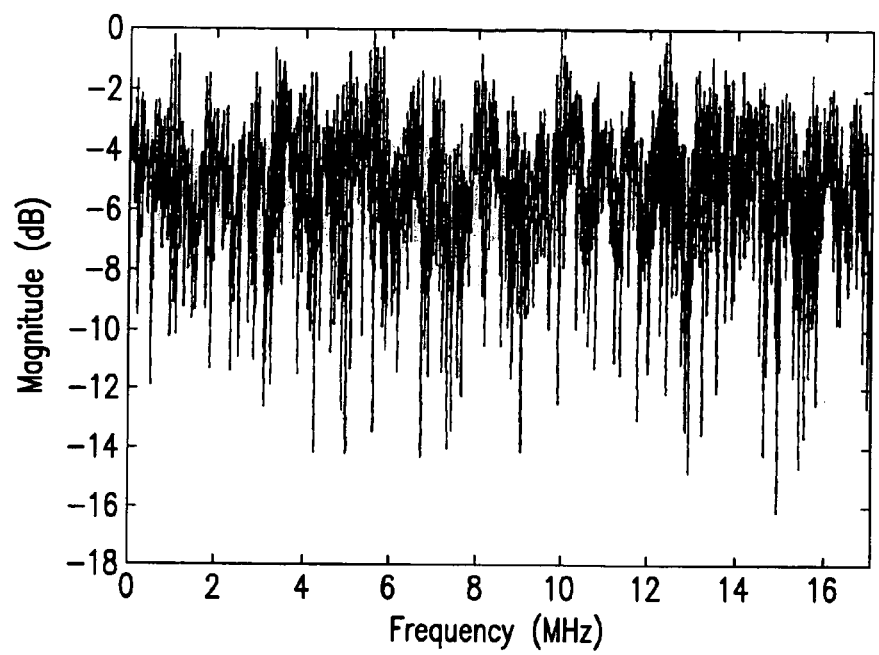
FIG. 4 is a chart depicting the power spectral density of the $Re\{x(t)\}$ response of the transmitted pulse train with a BW of 15 MHz and sample frequency of 34.13 MHz.

FIG. 4 is a chart depicting the power spectral density of the Re{x(t)} response of the transmitted pulse train with a 15 MHz bandwidth and a sample frequency of 34.13 MHz. FIG. 4 illustrates both the relatively low power radiated by the pulsed noise correlation radar 10 along with its random nature. This chart clearly illustrates the significant challenges that an unwanted receiver would encounter when trying to recognize this invention's transmitted signal.

Figure 5:
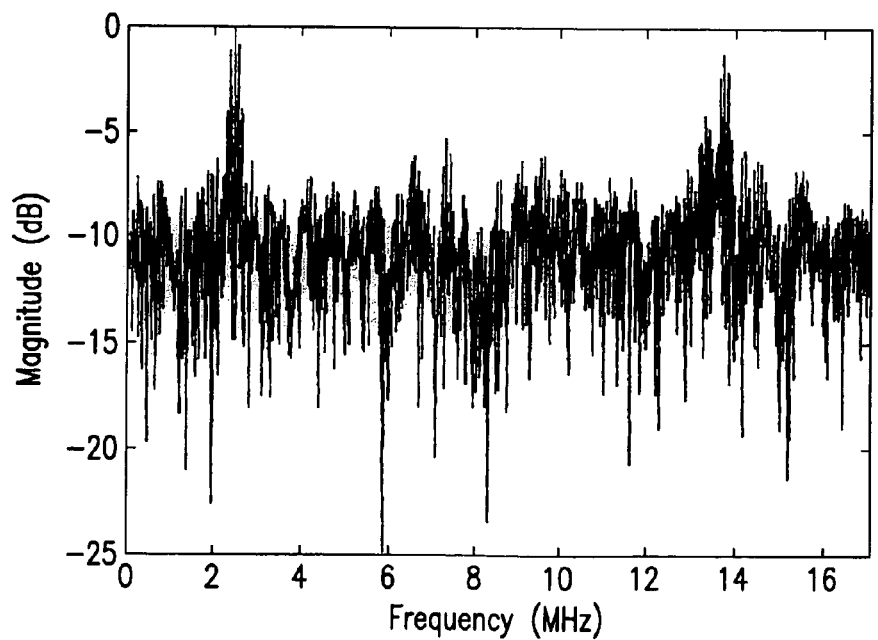
FIG. 5 is a chart depicting the power spectral density of the $Re\{y(t)\}$ response for the received signal after mixing with a BW of 15 MHz (10.0 m res) and sample frequency of 34.13 MHz.

FIG. 5 is a chart depicting the power spectral density of the Re{y(t)} response for the received signal after mixing with a BW of 15 MHz (10.0 m res) and sample frequency of 34.13 MHz. This chart illustrates the ability of the pulsed noise correlation radar 10 to resolve the signal from noise, both the additive and its own because the auto-correlation process allows the pulsed noise correlation radar 10 to extract the frequencies associated with the range to target time delays.

Figure 6:
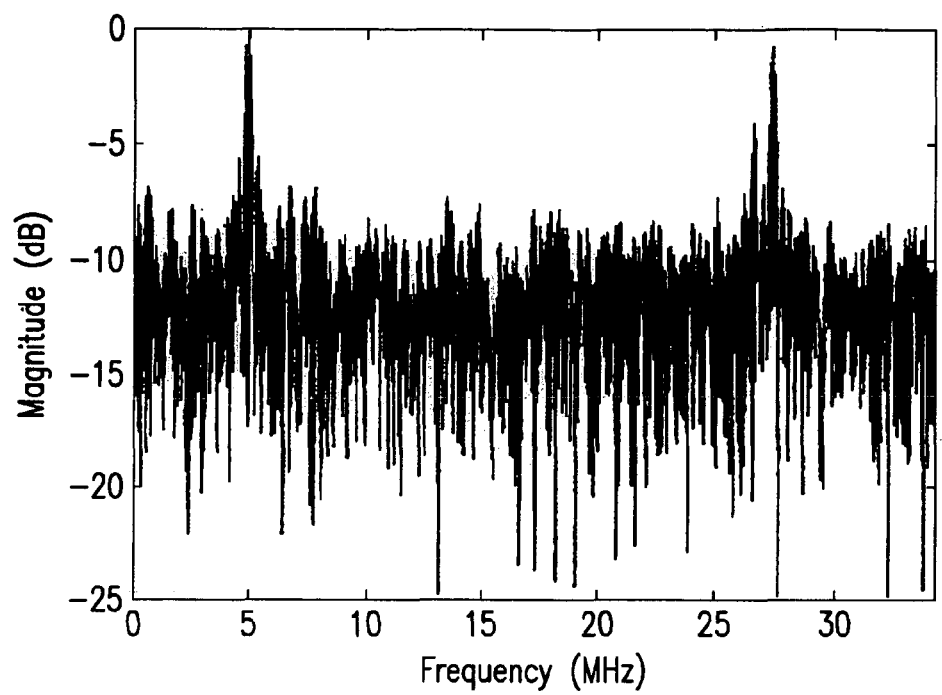
FIG. 6 is a chart illustrating the power spectral density of the $Re\{y(t)\}$ response for the received signal after mixing with a BW of 30 MHz (5.0 m res) and sample frequency of 68.27 MHz.
Figure 7:
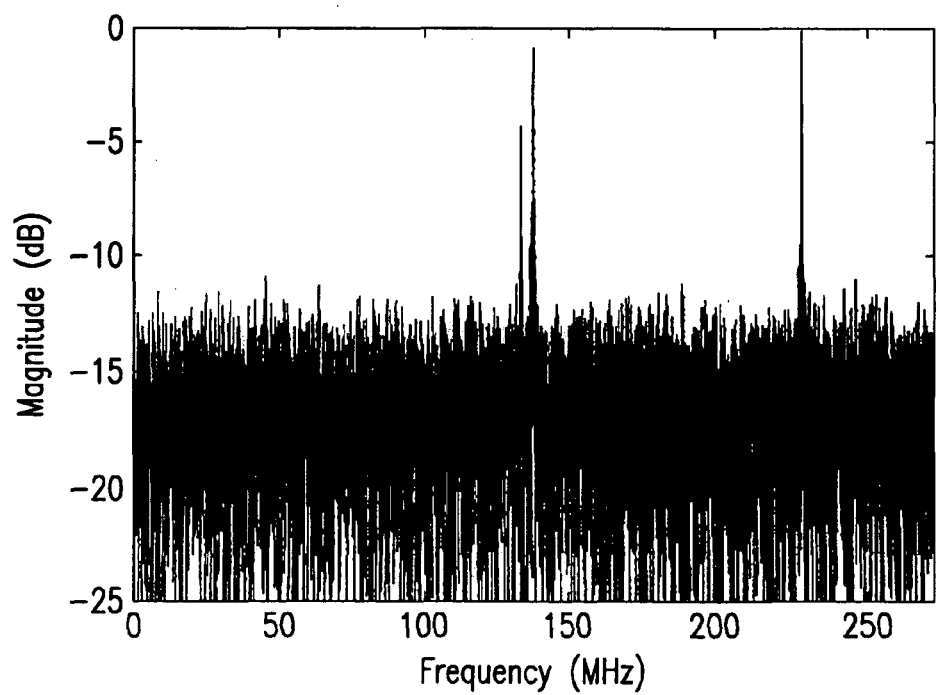
FIG. 7 is a chart illustrating the power spectral density of the $Re\{y(t)\}$ response for the received signal after mixing with a BW of 150 MHz (1.0 m res) and sample frequency of 546.13 MHz.

FIG. 6 is a chart illustrating the power spectral density of the Re{y(t)} response for the received signal after mixing with a BW of 30 MHz (5.0 m res) and sample frequency of 68.27 MHz and FIG. 7 is a chart illustrating the power spectral density of the Re{y(t)} response for the received signal after mixing with a BW of 150 MHz (1.0 m res) and sample frequency of 546.13 MHz. This charts show the pulsed noise correlation radar's ability to exploit the target's frequencies amidst interference and noise. These frequencies are evident from this chart because of their relatively higher power as compared to the channel noise floor. It will be appreciated by those skilled in the art that numerous other radar parameters may be effectively used in accordance with the present invention.

A number of variations of the pulsed noise correlation radar 10 are within the contemplation of the present invention, such as deploying the device on different platforms, commercial wireless systems and multi-channel arrays. This invention can be implemented in military, law enforcement, and numerous other applications. The pulsed LFM noise fused waveform proposed herein could also serve the commercial sector. In fact, the waveform conglomerate could be used in a commercial wireless environment where security requirements such as low probability of intercept and low probability of detection also known as LPI/LPD are highly desired. Furthermore, because of the ultra-wide band characteristics of the waveform, the receiver will be practically immune from the interference and channel fading typically associated with narrow band signals. Because this invention pulses the signal, frequency diversity could also be introduced if a multi-channel array was chosen thereby introducing spatial and temporal degrees of freedom exponentially more powerful than the pulsed noise correlation radar 10 single phase antenna. The pulsed noise correlation radar 10 of this invention can also be operated and controlled by software. This invention also encompasses a secure pulsed compression noise correlation radar system and many of the variations of the other embodiment also apply to the radar system.

Figure 8:
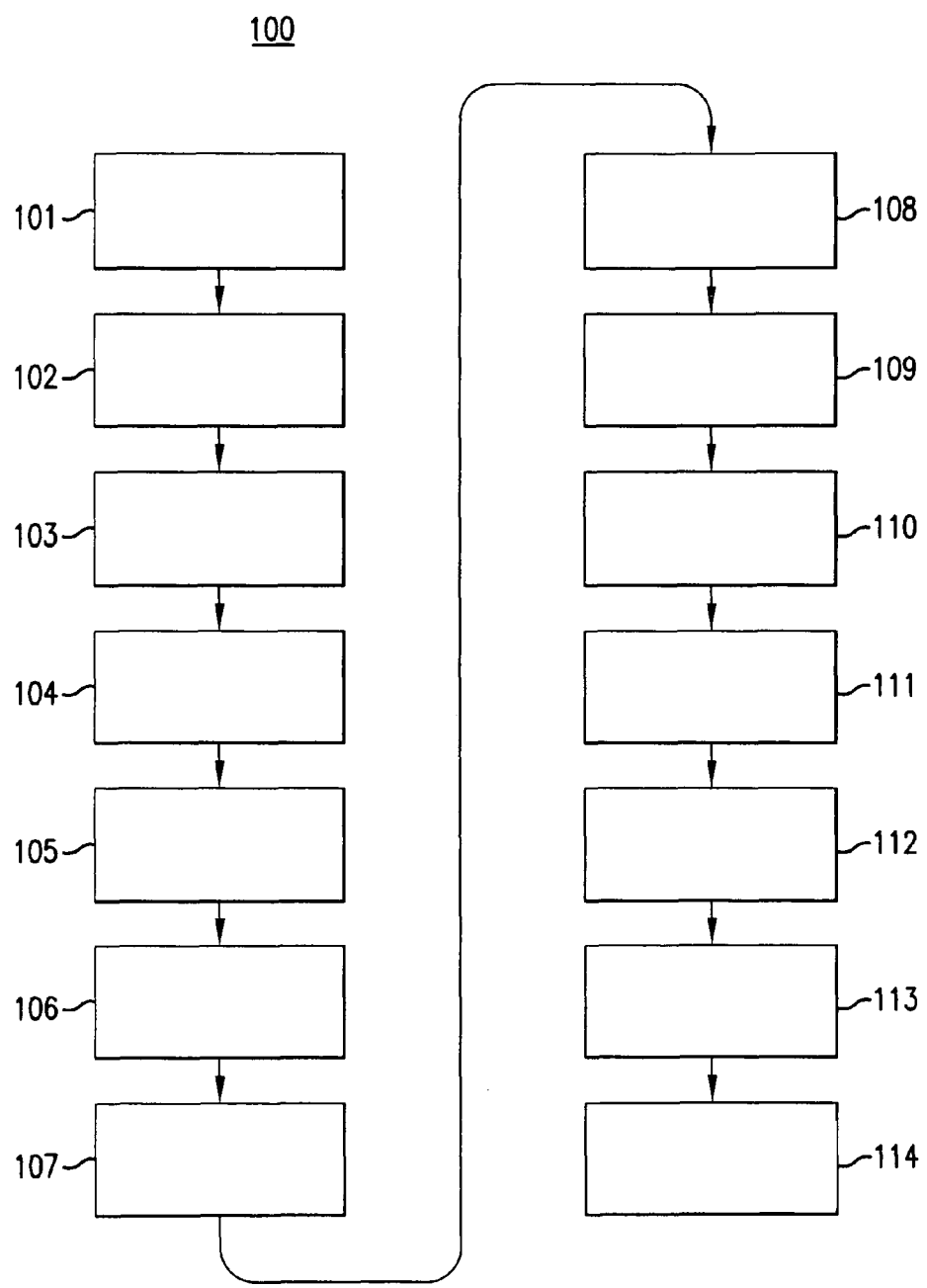
FIG. 8 is a flowchart depicting the steps of the method for detecting targets with pulsed noise correlation radar generating a pulsed LFM fused noise waveform in accordance with the present invention.

The present invention also encompasses a method for undetected target detection with pulsed noise correlation radar and a pulsed linear frequency modulated noise waveform 100. Referring now to FIG. 8, there is depicted a flow diagram of the steps of this invention's method for undetected target detection with a pulsed noise correlation radar and a pulsed linear frequency modulated noise waveform 100, comprising the steps generating a Gaussian noise signal with a normally distributed probability density function and that it is wide sense stationary, represented by Box 101; sending the Gaussian noise signal to a means for generating a pulse train, represented by Box 102; combining the Gaussian noise signal with a linear frequency modulated noise waveform in the pulse train generating means, represented by Box 103; generating a pulsed linear frequency modulated fused noise waveform x(t), represented by Box 104; sending the pulsed linear frequency modulated fused noise waveform x(t) to a means for sensing targets, represented by Box 105; and sending a signal from the target sensing means to a target, represented by Box 106.

The method continues with the steps of generating a range and radar cross section of the target, represented by Box 107; detecting a received signal r(t) from the target in a frequency demodulator, represented by Box 108; calculating a time dilation effect induced by target scintillation, which is represented by Box 109; generating a time dilated received signal r(t) that consolidates the received signal with the time dilation effect in a frequency demodulator, represented by Box 110; sending the time dilated received signal r(t) from the frequency demodulator to a means for correlation mixing, represented by Box 111; providing an auto-correlated signal, $R_{yy}(\tau)$, with the correlation mixing means integrating a product over time of the pulsed linear frequency modulated fused noise waveform x(t) and a conjugate of the time dilated received signal r(t), represented by Box 112; generating a Fast Fourier Transform of the auto-correlated signal, $R_{yy}(\tau)$), which is represented by Box 113; and converting the auto-correlated signal, $R_{yy}(\tau)$, to a transformed auto-correlated signal, $S_{yy}(f)$, that provides a plurality of discrete frequencies corresponding to the target causing the user to detect the target with a reduced transmit power, without emitting a detectable electronic signature, and without being intercepted, represented by Box 114. Many of the variations of the pulsed noise correlation radar 10 are also applicable to this invention's method. Although a Fast Fourier Transform is preferred, other transforms can be utilized.

1. INTRODUCTION

The concept of noise radar was first introduced in the 1950s by B. M. Horton where challenges surrounding his proposal were predominately due to hardware requirements needed for such a system to work affectively [1]. Due to modem hardware advances, the novelty of noise radar has begun to generate some recent interest. In fact, there has been a reemergence in research focused on using noise as an RF source. Narayanan et al., for example, designed and tested an ultra wideband (UWB) random noise radar (RNR) operating in the 1-2 GHz band at 200 meters in range. Results from this work established a solid basis for the feasibility of using noise as an RF source for the purposes of detecting targets [2]-[6]. Extensive work conducted by the Nanjing University (China) resulted in conclusive analysis describing an ideal waveform hybrid made up of UWB and random signal radar (RSR) waveforms where the authors determined that the best way to achieve a low probability of intercept/low probability of detect (LPI/LPD) system with low power and high resolution would be to combine these two waveforms [7]-[9]. The Russian Academy of Sciences has done extensive exploration on the plausibility of using code spectral modulation for communications systems, a technique first introduced in 1965 by J. L. Poirier [10], in order to insert data onto a random signal carrier where the concept of double spectral processing is exercised to extract the time delay corresponding to the information symbol [11]. Despite the availability of noise radar technology, the broader radar community has not yet fully embraced its attributes. The productivity of this work hopes to shorten this gap.

This research is motivated by the belief that a strong majority of conventional radar systems transmit energy openly. This implies an obvious susceptibility to some advanced, non-intended 2nd party passive receivers who might have an interest in understanding what the unsecured RF source's intentions are. It was therefore felt that some research in this area could serve as a means to suggest one possible solution for addressing this concern. It was also felt that the productivity of the research should appreciate two fundamental criteria: a) the proposed waveform should not impede the radar's primary functions e.g. target detection, terrain mapping, and b) the scope of incorporating the proposed waveform should be done with marginal impact to the host waveform structure.

Due to the nature of noise, both its time and frequency domain responses are random making it virtually impossible for the transmitted signal to be recognized and/or corrupted by non-intended 2nd party passive receivers without having a priori knowledge of the exact structure of the noise signal. However, transmitting noise alone is insignificant unless a carrier signal of specific frequency and phase is used as a reference. One practical approach is to do as Narayanan et al. did and artificially inject time-delayed replicas of the signal into the processing side of the system architecture. This was done in an effort to institute some form of coherence into their waveform while also reducing the overall computational complexity involved with signal processing. By selectively choosing specific time-delays, they in essence only needed to consider the presence of targets at certain ranges. As a result, when the radar returns were present in the candidate range bins, a well correlated signal would result. While what Narayanan et al. performed proved to be quite useful for the noise radar community, their approach only considered a short range test (<10 m) and a longer range test (200 m). Furthermore, their experimental set up suggests that specific hardware needs to be incorporated in order to successfully implement an UWB random noise radar. Because a majority of radar in use today implement a pulse-Doppler waveform structure, Narayanan's approach would impose a drastic impact to the architecture of these types of systems. These points clearly violate the fundamental criteria set forth earlier.

For these reasons, we consider herein a different noise radar approach that employs a composite waveform generated by amplitude modulating a complex pulse-Doppler waveform using noise. This waveform will serve as the basis for the inception of a newly defined noise radar class referred to by the authors as Noise Correlation Radar (NCR). It distinguishes itself from its peers, namely RNR and RSR, since neither a pure noise signal nor a modulated noise signal is transmitted. Instead, a pulse-Doppler waveform using pulse compression and linear frequency modulation (LFM) techniques serves as the host or modulated waveform. The LFM provides the coherence needed for proper correlation during the signal processing as well as the bandwidth necessary for resolving targets. It will be shown that the noise modulated pulse-Doppler waveform embodies the ideal characteristics of both noise radar and pulse-Doppler radar waveform in that it will have a chirped bandwidth (BW), pulse compression gain, masked transmit spectrum, and ideal ambiguity function. Notably, these facts appeal to many radar applications.

II. DESCRIPTION OF THE NOISE CORRELATION RADAR

Figure 9:
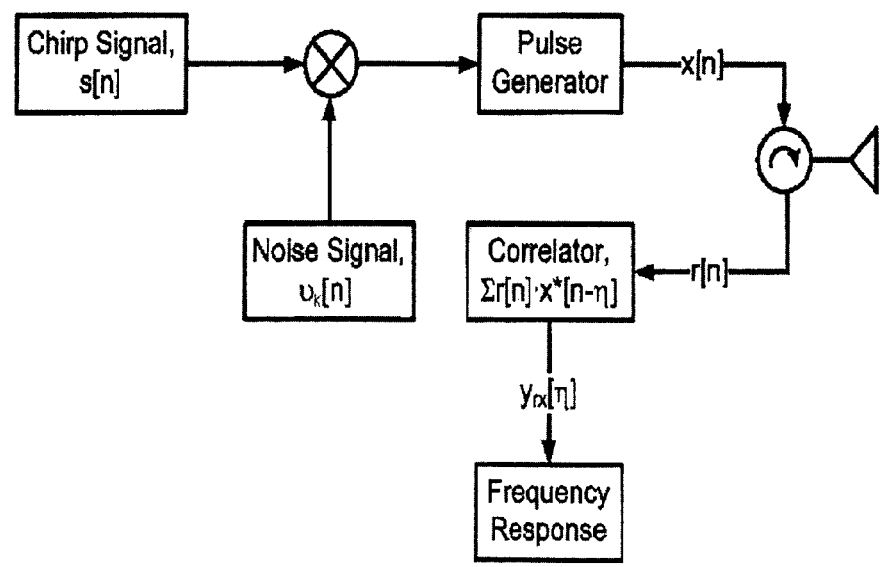
FIG. 9 is a block diagram of the Noise Correlation Radar (NCR). The noise signal $vk[n]$ having length N is aperiodic by nature where each of its samples varies from pulse to pulse.

A block diagram of the NCR is shown in FIG. 9. The transmitted pulse train x[n] consists of K coherent pulses over a predefined receive window (time) producing N samples per pulse. The conventional signal considered is a complex, discrete-time equivalent pulse-Doppler waveform s[n] that is amplitude modulated by an aperiodic noise $v_k[n]$. Both signals have identical lengths thereby allowing the noise signal to assume the same instantaneous bandwidth as the chirped signal. Within the pulse generator, we will assume that the timing control associated with the transmission of successive pulses is managed and maintained thereby reducing any isolation faults between the transmit-receive process. By synchronizing this process, we can successfully perform LFM demodulation to expose the presence of targets since they will induce delays (or frequency shifts) that reside in the received signal structure r[n]. The correlation between the transmit and receive signal results in the correlator output yrz[η] that is then ingested into the spectrum analyzer to produce the instantaneous frequency response.

The discrete pulse-Doppler waveform is modeled as follows, $$s[n] = e^{j2\pi\{f_0 \frac{n}{T} + \frac{\zeta}{T}[\frac{n}{T}]^2\}} \quad \text{Equation (8)}$$

$$= e^{j2\pi f_0 \frac{n}{T}} e^{j\pi\zeta[\frac{n}{T}]^2} \text{ for } n = 1\ldots N,$$

where $f_0$ is the chirp carrier frequency, n denotes the time index covering the span of the effective number of time samples N, T is the analog-to-digital conversion (ADC) rate, and $\zeta$ is the LFM coefficient. The pulse train can be represented by the following $$x[n] = \sum_{k=0}^{K} v_k[n] \cdot s[n - k \cdot PRI], \quad \text{Equation (9)}$$

where k is the index of the effective number of pulses K, PRI is the pulse repetition interval, and vk[n] is the amplitude modulating noise signal that varies from pulse to pulse. The range-to-target time delay is considered in the received signal and is defined by the following, $$r[n] = \alpha \cdot \sum_{k=0}^{K} v_k[n-\eta_t] \cdot s[n-\eta_t - k \cdot PRI] + d[n] \quad \text{Equation (10)}$$
$$= \alpha \cdot x[n-\eta_t] + d[n],$$

where $\alpha$ is the attenuation factor, $\eta_t$ is the range-to-target time delay, and $d[n]$ is the receive channel interference. The target is assumed to be point-targets having constant radar cross section between scans i.e. Swerling 1. A reference to all the parameters and values used in our simulation can be found in Table I below.

TABLE 1

SIMULATION PARAMETERS AND VALUES

| Parameter | Value |
|---|---|
| Carrier frequency, $f_c$ | 10 GHz |
| Unambiguous range, $R_u$ | 30 km |
| PRI | 200 μsec |
| PRF | 5000 Hz |
| Number of time samples, N | 2844 |
| Number of pulses, K | 16 |
| Duty factor, $d_T$ | 30% |
| Transmit pulse width, $\tau_{tx}$ | 60 μsec |
| CPI | 3.2 msec |
| Instantaneous bandwidth, $BW_i$ | 15 MHz |
| Range Resolution, $\rho_r$ | 10.0 m |
| Pulse compression ratio, $\xi$ | $\tau_{tx} \cdot BW_i$ |
| Number of FFT, $N_{FFT}$ | $2\log_2(\xi)$ |
| Frequency resolution, $\Delta_f$ | 1/CPI Hz |
| LFM coefficient, $\zeta$ | $BW_{tx}/\tau_{tx}$ Hz/sec |
| Sampling frequency, $f_s$ | $\Delta_f \cdot N_{FFT}$ Hz |
| Number of targets, $n_t$ | 3 |
| RCS | [5 12 10] m$^2$ |
| Range to targets, $R_t$ | [6 6.1 6.25] km |
| Velocity of targets, $v_t$ | [−10 0 10] m/s |

III. COMPARISON TO THE PRIOR ART

Figure 10:
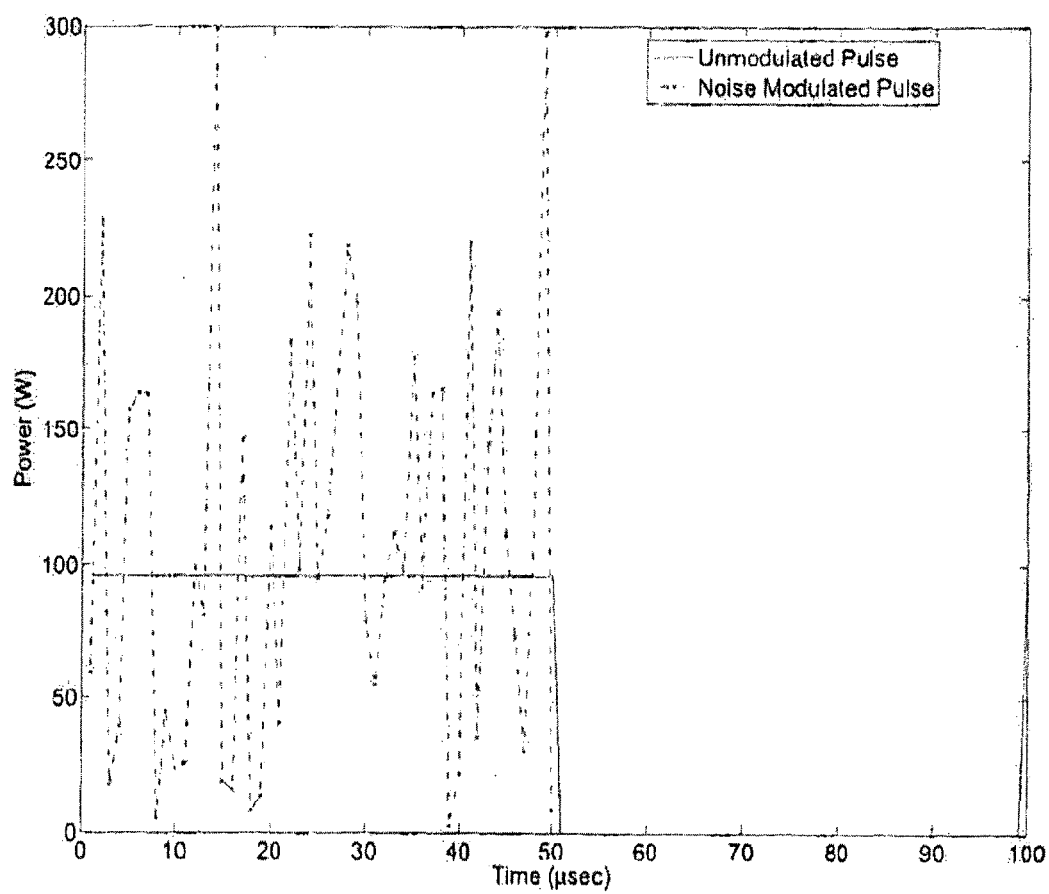
FIG. 10 is a chart plotting the normalized, noise modulated pulse possessing the same pulse compression gain and transmit energy as the unmodulated transmit pulse despite having large dynamic range; the transmit power of 96 W and pulse duration of 50 µsec were arbitrarily chosen to represent a typical radar pulse repetition interval.

A. Preserving the Pulse Compression Gain & Transmit Energy of the Pulse-Doppler Waveform Through direct digital synthesis, we can discretize the pulse-Doppler waveform such that each sample can be directly modulated by the noise signal without altering the transmit pulse duration. Because of this, the pulse compression gain is unabated since it is a function of the transmit pulse. On the other hand, trying to preserve the transmit energy is a little more challenging since the dynamic range of our noise modulated signal fluctuates so much. This point is illustrated in FIG. 10 where both the modulated transmit pulse and unmodulated pulse are plotted. We did find that by normalizing the modulating noise signal by its expected value, which is readily acquired by calculating the sample mean of the noise signal, we were able to arrive at a very similar power profile that suggests the same transmit energy as the unmodulated case. The fact that we have a large dynamic range between samples despite our normalization technique still poses a challenge to the transmitter and the power amplifier since there is no constant envelope as is the case with traditional pulse-Doppler radar waveform. One possible approach to mitigate this was introduced by the Massachusetts Institute of Technology, where they suggested the possibility of reducing the peak to average power by using an iterative algorithm that allows a more efficient form of linear amplification resulting in less transmitter power consumption by a factor of three at low signal-to-noise [12].

B. Masking the Pulse-Doppler Waveform

Figure 11:
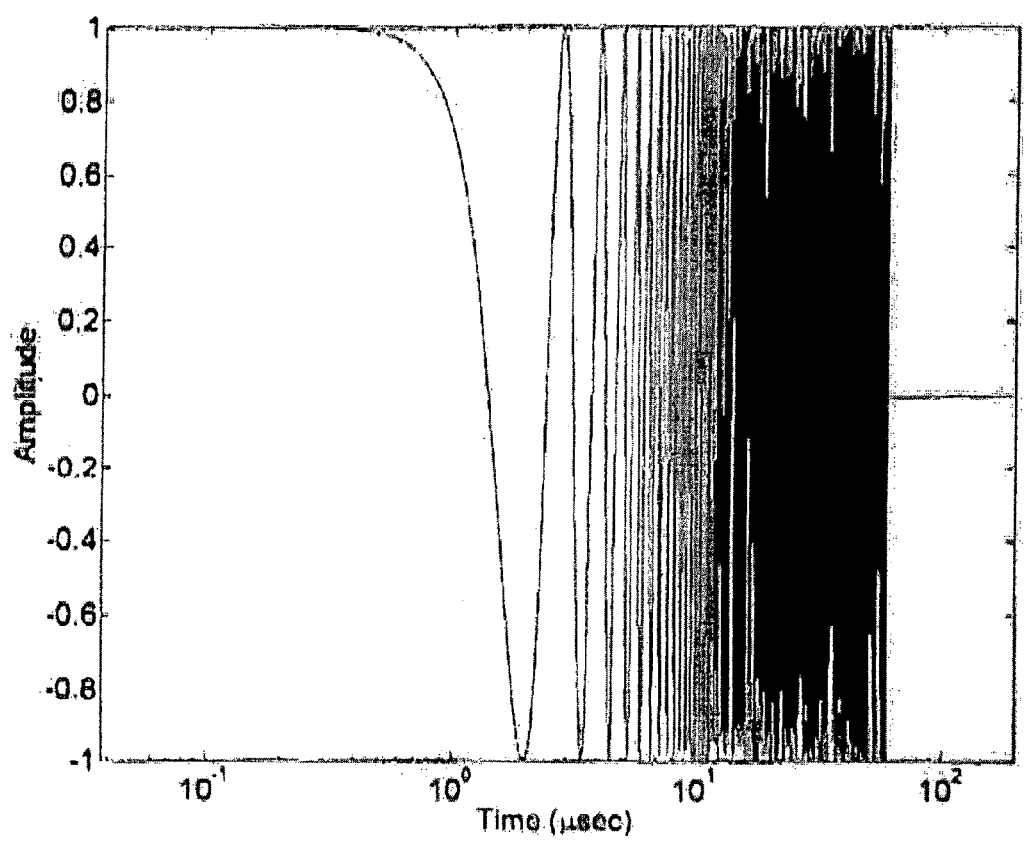
FIG. 11 is a chart plotting the transmitted pulse for the unmodulated pulse-Doppler waveform shown during the PRI.
Figure 12:
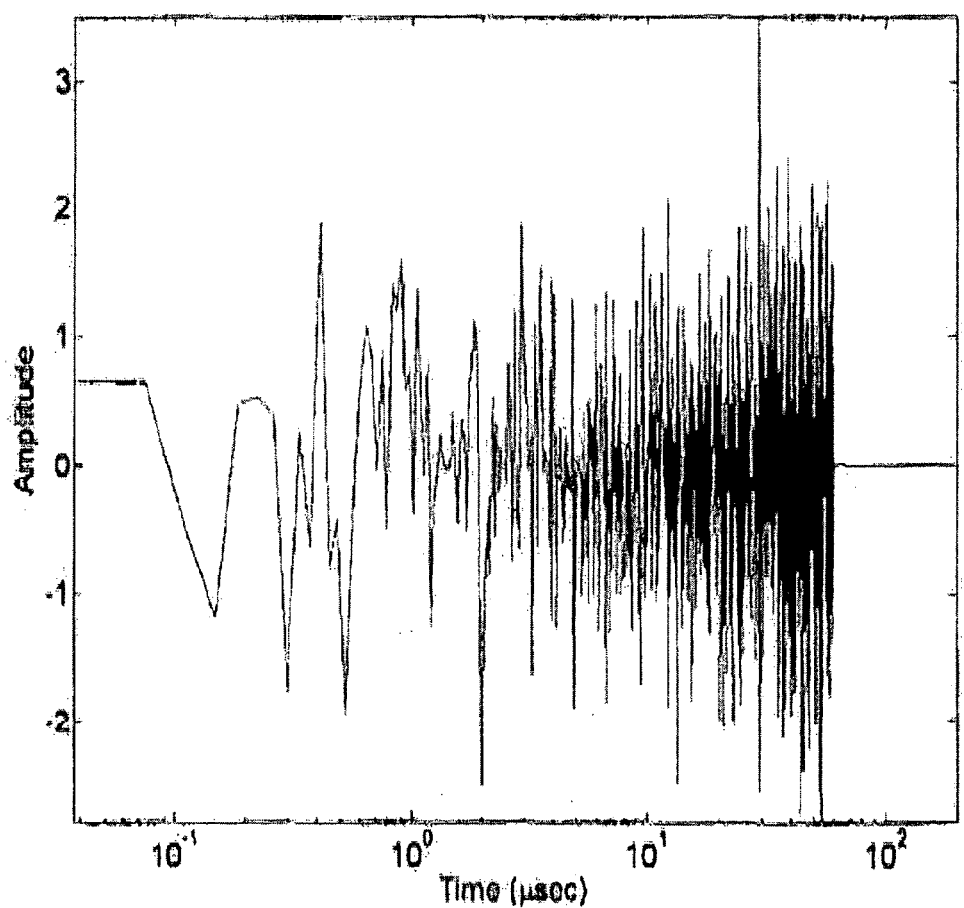
FIG. 12 is a chart plotting the noise modulated pulse-Doppler waveform shown during the PRI.

The masking effectiveness of the noise modulating signal is a critical component of the NCR. FIGS. 11 and 12 show the transmit pulse (amplitude only) as having a 30% duty placing energy in the first 60 μsec of its 200 μsec PRI. This is similar to what many pulsed radar systems do, however, the amplitude and phase (not shown) of the pulse shown on the right is completely random and lacks the constant envelope typically associated with chirped waveform. This, in essence, is the masking effect introduced by the noise modulating signal. The transmit pulse width for both waveforms in FIGS. 11 and 12 is 60 μsec or 30% of the full 200 μsec PRI. By introducing the amplitude modulating noise signal, we impart a masking effect that distinguishes the noise modulated pulse-Doppler waveform from the traditional unmodulated pulse-Doppler waveform distinguished by its constant envelope. Because there are 2844 time samples per pulse, the abscissa is shown using a logarithmic scale and enables us to see the deviations between waveforms.

Figure 13:
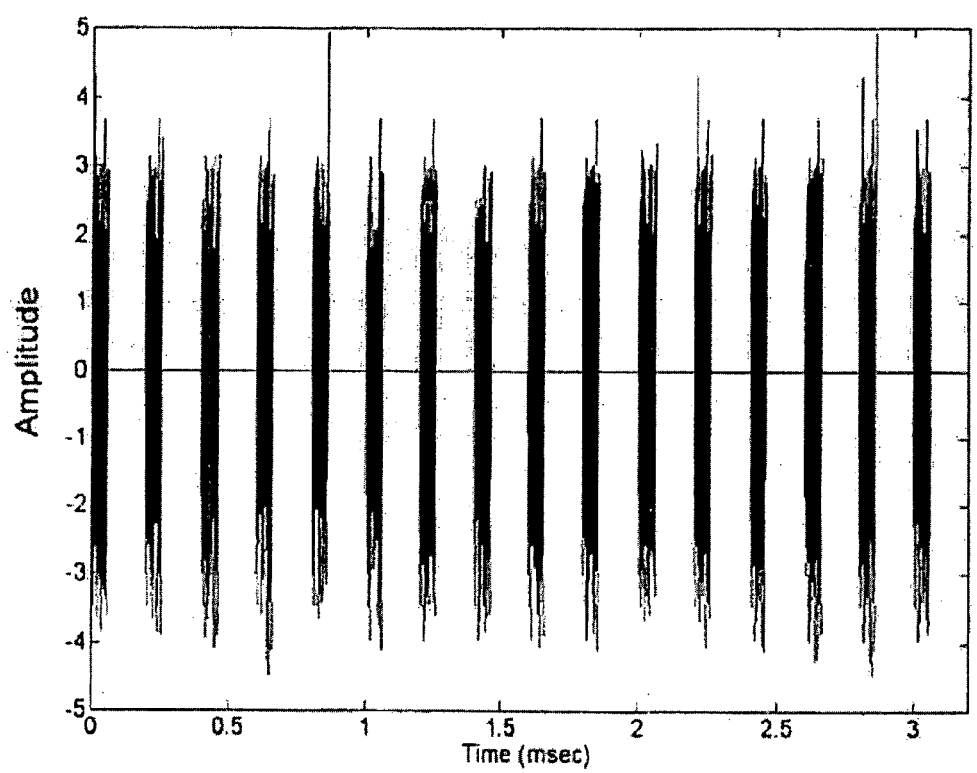
FIG. 13 is a chart plotting the coherent processing interval for the transmit signal where each pulse is processed during their respective receive windows; the noise modulating signal $vk[n]$ is digitally stored in memory and later referenced by the correlator.
Figure 14:
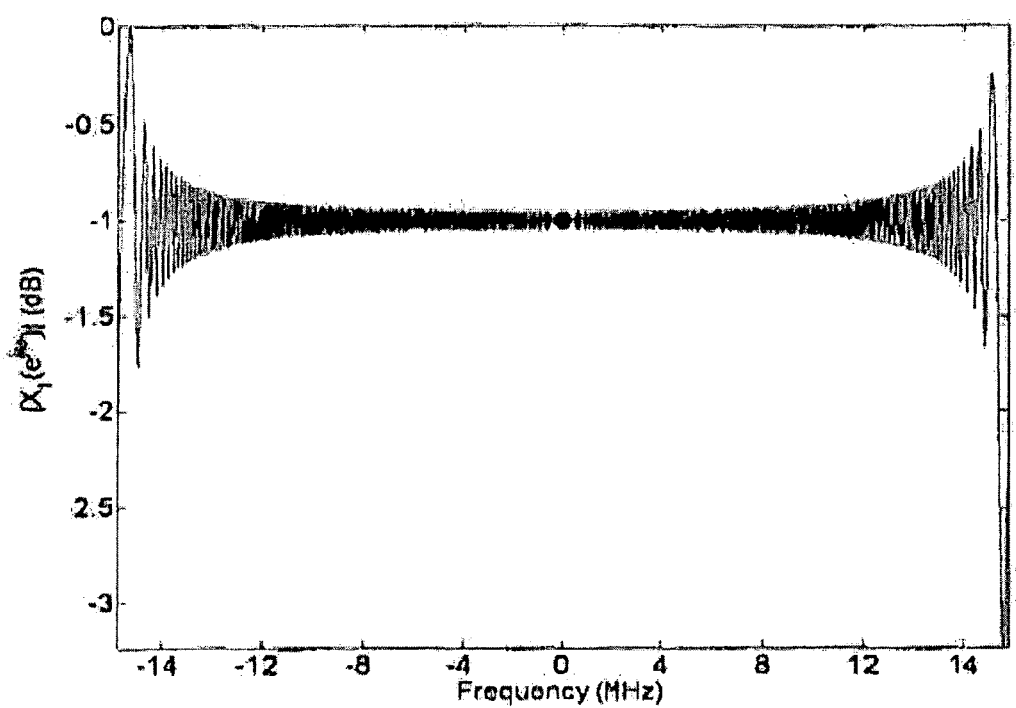
FIG. 14 is a chart plotting the spectrum of the unmodulated waveform for the transmitted signal where the noise modulated version is exhibiting a completely random signal spectrum.
Figure 15:
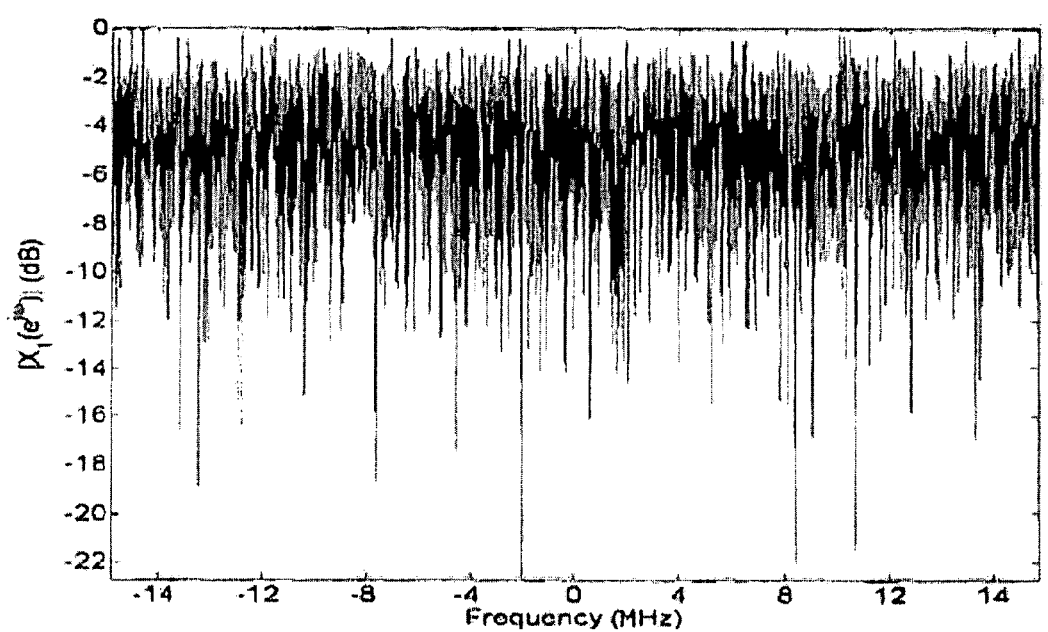
FIG. 15 is a chart plotting the spectrum of the noise modulated waveform for the transmitted signal where the noise modulated version is exhibiting a completely random signal spectrum.

The CPI consisting of the 16 pulses used in our simulation is shown in FIG. 13. This was done to illustrate the fact that each pulse has a completely random and different amplitude. The resultant transmit frequency spectrum of x[n] is also included and is shown in FIGS. 14 and 15. As expected, the spectrum of the transmitted signal is completely random, and is in agreement with the duality of noise's random nature across both the time and frequency domains. The random nature of the signal makes recognition of the modulated pulse-Doppler waveform virtually impossible for unintended $2^{nd}$ party passive receivers trying to understand the intentions of the transmitted signal. Furthermore, this spectrum still embodies the chirped waveform necessary for resolving targets.

C. Radar Ambiguity Function for the Noise Modulated Pulse-Doppler Waveform

Both the Pennsylvania State University and the Ukrainian National Academy of Sciences have done extensive work with characterizing noise radar implementation. One notable discovery pertained to the fact that noise radar exhibit a "thumb tack"-like ambiguity response [5], [13]-[18]. This has obvious performance appeal since it essentially says that the transmitted waveform minimizes the number of occurrences in which time-frequency combinations can be wrongly associated. An essential part in establishing the feasibility of our noise modulated pulse Doppler waveform needed to include some quantifiable measure of the radar ambiguity function. Therefore, by tailoring the classic radar ambiguity function to that of our waveform design, we arrived at the following definition, $$|\chi(\eta, f_d)|^2 = \left| \sum_{n=-\infty}^{+\infty} x[n] \cdot x^*[n-\eta] e^{-j2\pi f_d \frac{n}{T}} \right|^2, \quad \text{Equation (11)}$$

where $\eta_t$ is the range-to-target time delay, $f_d$ is the Doppler frequency, n is the effective number of time samples, x[n] is the pulse train defined in (3), and T is the ADC rate. It's important to note that Equation (11) is a two-dimensional function that gives the performance of the waveform as a function of time and frequency. For simplicity, we chose to take the zero-Doppler and zero-delay cuts of the ambiguity function because it allows us to look at each plot individually.

Figure 16:
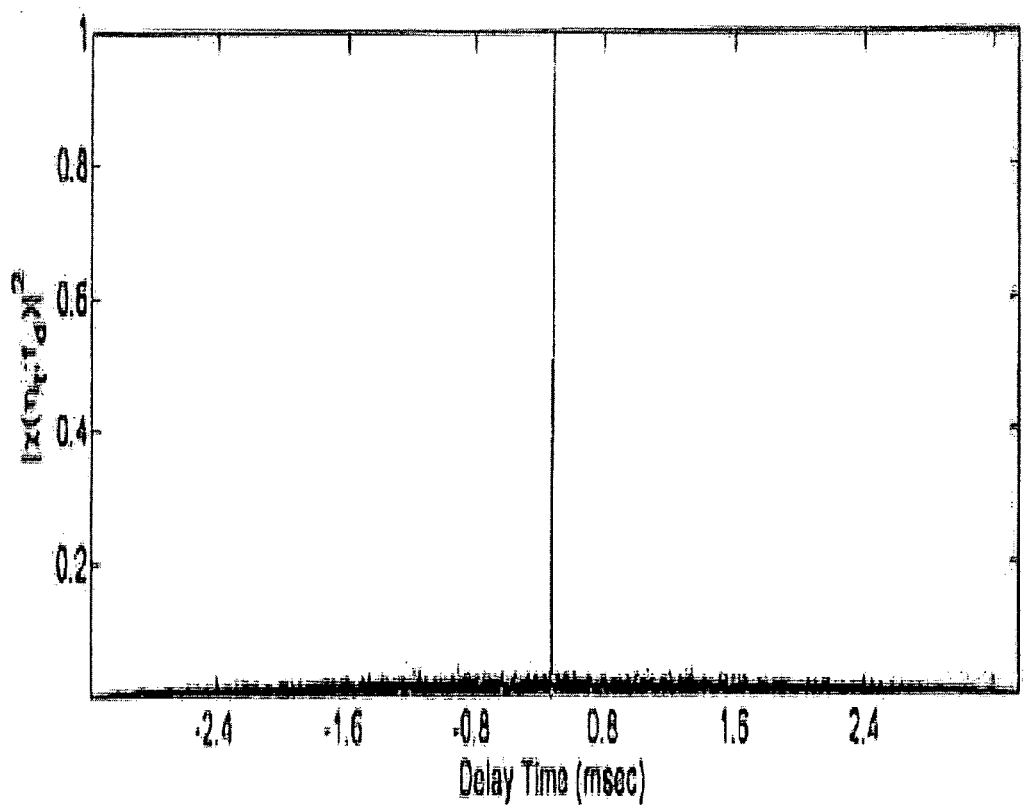
FIG. 16 is a chart plotting zero-delay cut for the noise modulated pulse-Doppler waveform; the zero-delay cut is exhibiting a thumb tack response and is spanned over the ±range of a single CP.
Figure 17:
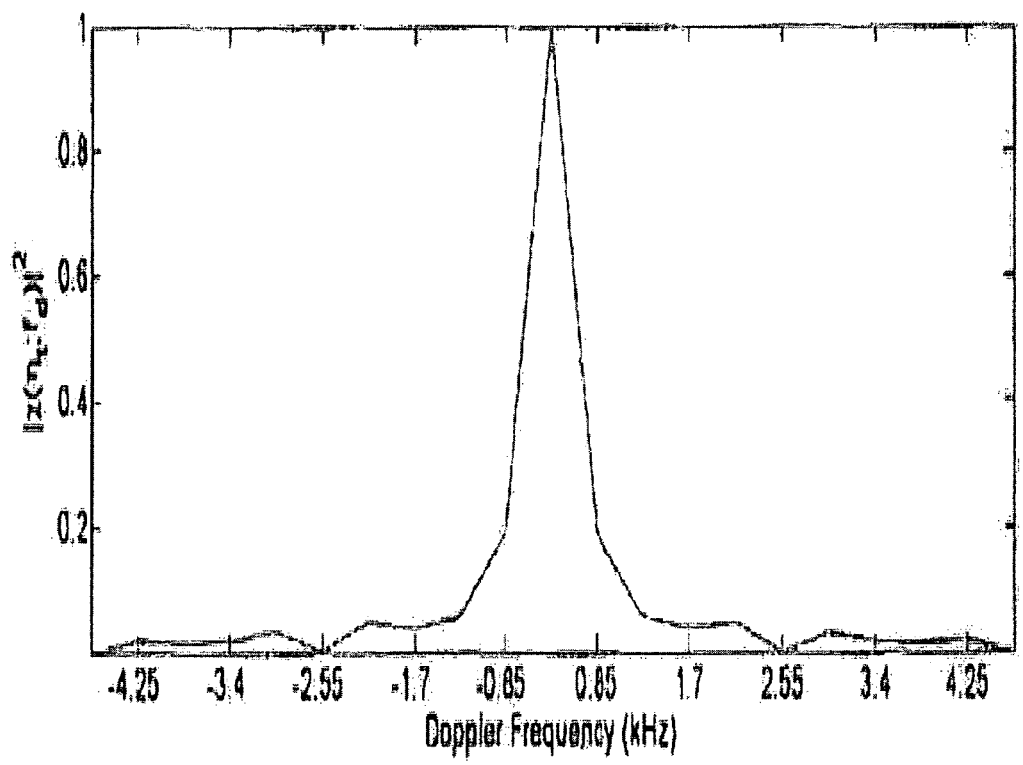
FIG. 17 is a chart plotting zero-Doppler cut for the noise modulated pulse-Doppler waveform; the zero-Doppler cut also exhibits a very narrow response considering the fact that we've only integrated over 16 pulses; the zero-Doppler cut spans over the ±PRF range since this essentially embodies the maximum extent of all Doppler responses.

At first glance, FIGS. 16 and 17 illustrates both cuts as having relatively low side lobes as compared to the main peak at the center of the plot i.e., $|\chi(0;0)|^2$, which would suggest that the proposed waveform would have significant signal-to-noise ratio (SNR) given highly competitive receiver channel interference. Secondly, the zero-Doppler cut shows a very narrow response at the center, which agrees with what Narayanan and Lukin et. al. discovered. This suggests that our transmit waveform will incur very low range ambiguities despite the introduction of the amplitude modulating noise signal. Lastly, the zero-delay cut shows a slight broadening of the central lobe leading us to believe that our waveform is almost ideal, however after close inspection we feel that this results because we are only integrating over 16 pulses. The computational complexity associated with calculating the ambiguity function dictated this outcome. In fact, it could be shown that as the number of pulses K approaches infinity, $|\chi(0;0)|^2$ will assume a $\delta$-function shape. Therefore, by integrating over more pulses, the characteristic response expected of our noise waveform would have resulted.

Figure 18:
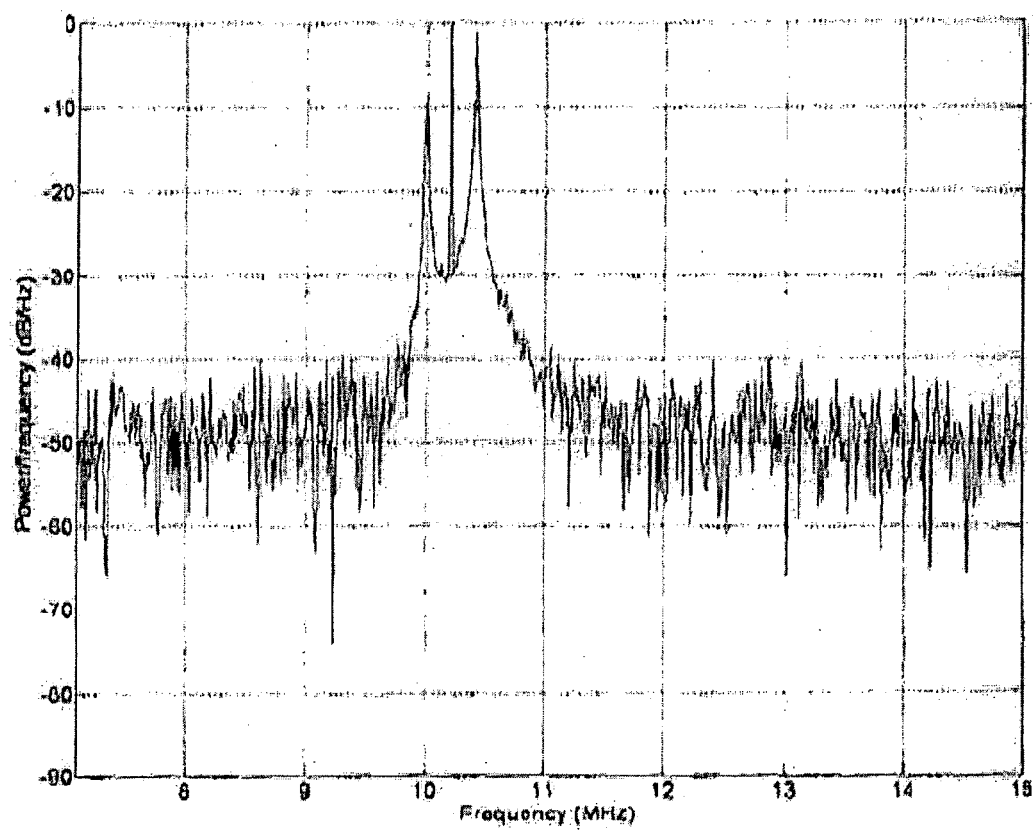
FIG. 18 is a chart plotting PSD of the noise modulated pulse-Doppler waveform's auto-correlated signal exhibiting three discrete frequencies corresponding to the targets of interest located at 6, 6.1 and 6.25 km; distinct target frequencies are located approximately at 10.0 MHz, 10.17 MHz, and 10.42 MHz all corresponding to the range-to-target time delays.

D. Target Detection Approach Using the Noise Modulated Pulse-Doppler Waveform The target detection approach was conducted in simulation by way of classical correlation mixing techniques. We will assume that our system is able to successfully correlate the received signal with that of the reference signal, thereby allowing us to extract the range-to-target time delays $\eta_t$ manifested in the receive signal. By accumulating the product of the received signal r[n] with a conjugated, time-shifted version of the transmitted signal x[n] we were able to examine the target resolvability of the proposed scheme given its cross-correlation function defined by the following, $$y_{rx}[\eta] = \sum_{n=-\infty}^{+\infty} r[n] \cdot x^*[n-\eta], \quad \text{Equation (12)}$$

$$= \alpha \cdot \sum_{n=-\infty}^{+\infty} \{x[n-\eta_t] + d[n]\} \cdot x^*[n-\eta]$$

where the range-to-target time delays are accounted for as one would expect. The three targets considered in our simulation were intentionally spaced more than two resolutions cells apart and were given nominal velocities of $-10$, 0, and 10 m/sec respectively. Closer inspection of Equation (12) resembles the auto-correlation function of x[n] with the inclusion of the disturbance signal d[n] and the attenuation factor $\alpha$. As a result, the power spectral density (PSD) is used to visually assess the detection capability of our waveform. Since the PSD only takes a single transform of the time-compressed data, the results from this test solely considered frequencies along the range dimension. This was useful since it essentially allowed us to determine the ability of waveform to resolve targets in range. Results from this calculation are plotted on FIG. 18 where three distinct targets can clearly be resolved. The simulated results were in agreement with what we expected from the theoretical values, and can be verified by $$f_t = \frac{c \cdot R_1 \cdot \zeta}{2}.$$

Figure 19:
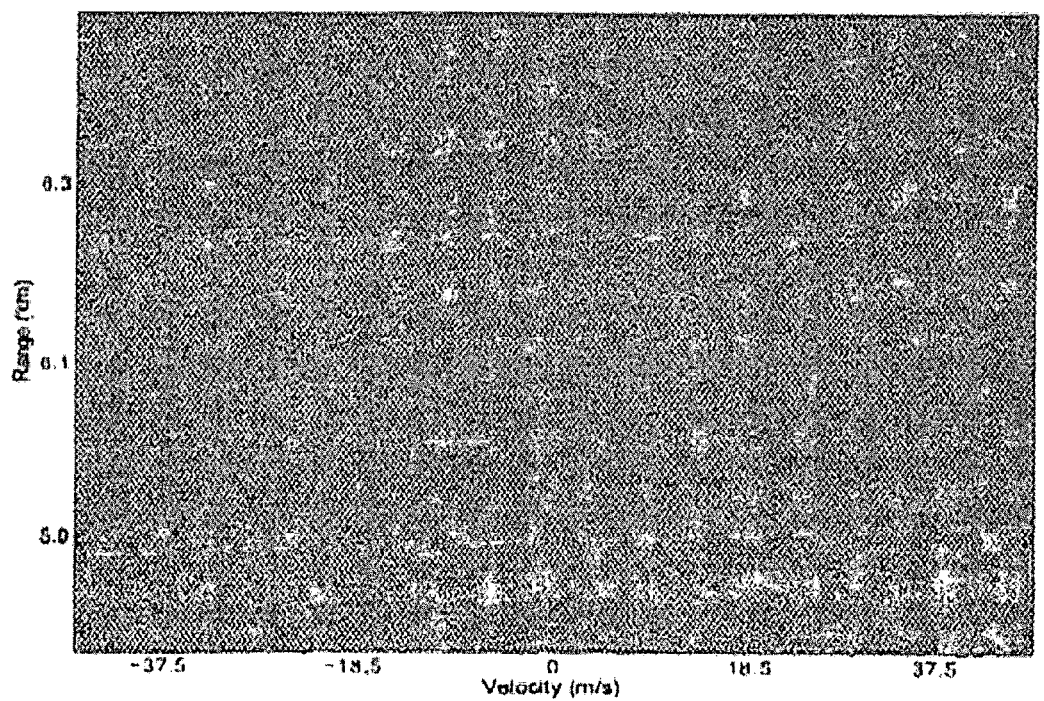
FIG. 19 is a chart plotting range-Doppler map of our noise modulated pulse-Doppler waveform clearly showing that our modulated waveform is able to successfully detect both stationary and moving targets despite the presence of both our noise modulating signal and channel noise.

In addition to the fast-time samples considered in the PSD, it was felt that the slow-time samples should also be considered since these are what would be necessary to test our waveform's ability to detect moving targets. This is executed by taking a second transform of the auto-correlated signal yrz [η], and allowed us to isolate target velocities to their corresponding Doppler bins. The results from this operation are shown on of FIG. 19, which clearly shows our waveform's ability to detect the three targets at range with their corresponding velocities.

IV. CONCLUSION

The plausibility of masking a pulse-Doppler waveform with a noise modulating signal has been demonstrated. Through simulation, we have verified that our waveform is indeed able to resolve both stationary and moving targets with minimal ambiguity despite the presence of both the noise modulating signal and channel noise. It was shown that the waveform being transmitted was neither a pure noise signal or a modulated noise signal as is the case with Random Noise Radar (RNR) and Random Signal Radar (RSR), but rather a conglomerate comprised of noise and pulse-Doppler waveform giving way to a newly defined noise radar class referred to by the authors as Noise Correlation Radar (NCR). We have shown that the noise modulated pulse Doppler waveform embodies the ideal characteristics of both noise radar and pulse-Doppler radar waveform in that it has a chirped bandwidth, pulse compression gain, masked transmit spectrum, and ideal ambiguity function thereby appealing to many radar applications.

This work investigates the plausibility of using noise to amplitude modulate a pulse-Doppler radar waveform without disturbing the modulated signal's ability to resolve stationary and moving targets. The novelty of the work lies in the fact that the waveform being transmitted is neither a pure noise signal nor a modulated noise signal as is the case with Random Noise Radar (RNR) and Random Signal Radar (RSR), but rather a conglomerate comprised of noise and pulse-Doppler waveform. This unique combination gives way to a newly defined noise radar class referred to hereinabove as Noise Correlation Radar (NCR). By introducing the noise envelope, we show that our waveform arrives at some unique advantages not found in conventional pulse-Doppler waveform and coincidentally, some noise radar as well. Results were generated from computer simulation and demonstrate that the proposed waveform possesses the same characteristics found in the aforementioned radar classes with the addition of several distinct advantages. Figures are included to illustrate how the transmit spectrum of our noise modulated pulse-Doppler waveform assumes an ideal ambiguity function while acquiring a "masked" transmit spectrum. It is also shown that the addition of the noise modulating signal does not negatively impact the pulse compression gain or transmit energy of the modulated signal.

REFERENCES

[1] B. M. Horton, "Noise-Modulated Distance Measuring Systems", *IRE Proc.*, vol. 47, no. 5, pp. 827-828, May 1959.

[2] R. M. Narayanan and M. Dawood, "Doppler Estimation Using a Coherent Ultrawide-Band Random Noise Radar", *IEEE Trans. on Antennas & Propagation*, vol. 48. no. 6, pp. 868-878, January 2000.

[3] M. Dawood and R. M. Narayanan, "Receiver Operating Characteristics for the Coherent UWB Random Noise Radar", *IEEE Trans. on Aerospace & Electronic Systems*, vol. 37, no. 2, pp. 586-594, April 2001.

[4] M. Dawood and R. M. Narayanan, "Multipath and Ground Clutter Analysis for a UWB Random Noise Radar", *iEEE Trans. on Aerospace & Electronic Systems*, vol. 38, April 2002.

[5] M. Dawood and R. M. Narayanan, "Generalized Wideband Ambiguity Function of a Coherent Ultrawide Band Random Noise Radar", *IEE Proc. Radar, Sonar and Navigation*, vol. 150, no. 5, pp. 379-386, October 2003.

[6] Z. Li and R. M. Narayanan, "Doppler Visibility of Coherent Ultrawide Band Random Noise Radar System", *IEEE Trans. on Aerospace & Electronics*, vol. 42, no. I, pp. 160-173, January 2006.

[7] L. Guosui, G. Hong, Z. Xiaohua, and S. Weimin, "The Present and Future of Random Signal Radars", *IEEE Aerospace and Electronic Systems Magazine*, vol. 12, no. 10, pp. 35-40, October 1997.

[8] H. Sun, Y. Lu, G. Liu, "Ultra-Wideband Technology and Random Signal Radar: An Ideal Combination," *IEEE Aerospace and Electronic Systems Magazine*, vol. 18, no. 11, pp. 3-7, November 2003.

[9] G. Liu, H. Gu, W. Su, and H. Sun, "The Analysis and Design of Modem Low Probability of Intercept Radar," *Proc. of CIE International Conference on Radar* 2001, Chinese Institute of Electronics International Conference on Radar, January 2001, Beijing, China, pp. 120-124, January 2001.

[10] J. L. Poirier, "Quasi-Monochromatic Scattering and Some Possible Radar Applications", *Radio Science*, vol. 3, no. 9, pp. 231-237, 1965.

[II] V. Kalinin, A. Panas, V. Kolesov, and V. Lyubchenko, "Ultra Wideband Wireless Communication on the Base of Noise Technology," *Proc. International Conference on Microwaves, Radar & Wireless Communications* (M1KON), Krakow, Poland, pp. 615-618, May 2006.

[12] E. Huang, G. Wornell, "Peak to Average Power Reduction for Low-Power OFDM Systems", *Proc. International Conference on Communications,*

[13] K. A. Lukin, "Noise Radar Technology", *Telecommunications and Radio Engineering*, vol. 55, no. 12, 9 pages, 2001.

[14] K. A. Lukin, A. A. Mogyla, et al., "Implementation of Software Radar Concept in Surveillance Radar on the Basis of Pulsed Noise Waveform", *Abstracts of International Conference on the Noise Radar Technology* (NRT 2003), Kharkov, Ukraine, 2003, pp. 15-16, October 2003.

[15] K. A. Lukin, A. A. Mogyla, D. Suprun, "High Resolution SAR on the Basis of Pulsed Noise Waveform", *Proc. of 5th European Conference on Synthetic Aperture Radar* (EUSAR 2004), vol. 2, neu-Ulm, Germany, 2004, pp. 683-686, May 2004.

[16] KA Lukin, A. A. Mogyla, and Y. A. Shiyan, "Ambiguity Function of Noise Pulse Train and its Distortions in Noise Radar Receiver", *Proc. International Radar Symposium* (IRS 2004), Warszawa, Poland, 2004, pp. 37-42, May 2004.

[17] K. A. Lukin, "Noise Radar Technology: the Principles and Short Overview", *Applied Radio Electronics*, vol. 4, no. 1, pp. 4-13, 2005.

[18] K. A. Lukin, "Radar Designs Using Random Noise Waveforms", *Pmc. International Radar Symposium* (IRS 2006), Krakow, Poland, pp. 1-4, May 2006.

These embodiments of the present invention are intended to be illustrative and not limiting with respect to the variety of possible embodiments. It is to be further understood that other features and modifications to the foregoing detailed description of the target detection apparatus, systems and methods are all considered to be within the contemplation of the present invention, which is not limited by this detailed description. Those skilled in the art will readily appreciate that any number of configurations of the present invention and numerous modifications and combinations of materials, components, geometrical arrangements and dimensions can achieve the results described herein, without departing from the spirit and scope of this invention. Accordingly, the present invention should not be limited by the foregoing description, but only by the appended claims.

What I claim is:

1. A pulsed compression noise correlation radar target detection apparatus, comprising:

a wide sense stationary Gaussian noise signal generator generates a Gaussian noise signal and a normally distributed probability density function;

a means for generating a pulse train combines said Gaussian noise signal with a linear frequency modulated noise waveform, generates a pulse train modulating said Gaussian noise signal and provides a pulsed linear frequency modulated fused noise waveform x(t) to a means for sensing targets;

said target sensing means sends a signal to a target and generates a range and radar cross section of targets;

a frequency demodulator detects a received signal r(t) from said target;

said frequency demodulator, having a means for calculations, calculates a time dilation effect induced by target scintillation and generates a time dilated received signal r(t) that includes said time dilation effect;

said frequency demodulator sends said time dilated received signal r(t) to a means for correlation mixing;

said correlation mixing means integrates a product over time of said pulsed linear frequency modulated fused noise waveform x(t) and a conjugate of said time dilated received signal r(t) to provide an auto-correlated signal $R_{yy}(\tau)$;

a Fast Fourier Transformer converts said auto-correlated signal $R_{yy}(\tau)$ into a transformed auto-correlated signal, $S_{yy}(f)$, that provides a plurality of discrete frequencies corresponding to said target causing the user to detect said target with a reduced transmit power, without emitting a detectable electronic signature, and without being intercepted.

2. The pulsed compression noise correlation radar target detection apparatus, as recited in claim 1, further comprising said transformed auto-correlated signal realizing a power spectral density that exploits a plurality of time dilation effects induced by target scintillation.

3. The pulsed compression noise correlation radar target detection apparatus, as recited in claim 2, further comprising said pulsed linear frequency modulated fused noise waveform x(t) increasing a carrier frequency to realize a plurality of band widths.

4. The pulsed compression noise correlation radar target detection apparatus, as recited in claim 3, further comprising said pulse generating means being a frequency modulator.

5. The pulsed compression noise correlation radar target detection apparatus, as recited in claim 4, further comprising said target sensing means being a single phase antenna.

6. The pulsed compression noise correlation radar target detection apparatus, as recited in claim 4, further comprising said target sensing means being a multi-channel antenna array.

7. The pulsed compression noise correlation radar target detection apparatus, as recited in claim 4, further comprising a means for data processing means and a software program.

8. A secure pulsed compression noise correlation radar system, comprising:
a wide sense stationary Gaussian noise signal generator generates a Gaussian noise signal and a normally distributed probability density function;
a means for generating a pulse train combines said Gaussian noise signal with a linear frequency modulated noise waveform, generates a pulse train modulating said Gaussian noise signal and provides a pulsed linear frequency modulated fused noise waveform x(t) to a means for sensing targets;
said target sensing means sends a signal to a target and generates a range and radar cross section of targets;
a frequency demodulator detects a received signal r(t) from said target;
said frequency demodulator, having a means for calculations, calculates a time dilation effect induced by target scintillation and generates a time dilated received signal r(t) that includes said time dilation effect;
said frequency demodulator sends said time dilated received signal r(t) to a means for correlation mixing;
said correlation mixing means integrates a product over time of said pulsed linear frequency modulated fused noise waveform x(t) and a conjugate of said time dilated received signal r(t) to provide an auto-correlated signal $R_{yy}(\tau)$; and
a Fast Fourier Transformer converts said auto-correlated signal $R_{yy}(\tau)$ into a transformed auto-correlated signal, $S_{yy}(f)$, that provides a plurality of discrete frequencies corresponding to said target causing the user to detect said target with a reduced transmit power, without emitting a detectable electronic signature, and without being intercepted.

9. The secure pulsed compression noise correlation radar system, as recited in claim 8, further comprising said transformed auto-correlated signal realizing a power spectral density that exploits a plurality of time dilation effects induced by target scintillation.

10. The secure pulsed compression noise correlation radar system, as recited in claim 9, further comprising said pulsed linear frequency modulated fused noise waveform x(t) increasing a carrier frequency to realize a plurality of band widths.

11. The secure pulsed compression noise correlation radar system, as recited in claim 10, further comprising said pulse generating means being a frequency modulator.

12. The secure pulsed compression noise correlation radar system, as recited in claim 11, further comprising said target sensing means being a single phase antenna.

13. The secure pulsed compression noise correlation radar system, as recited in claim 11, further comprising said target sensing means being a multi-channel antenna array.

14. The pulsed compression noise correlation radar target detection apparatus, as recited in claim 11, further comprising a means for data processing means and a software program.

15. A method for secure target detection with pulsed noise correlation radar and a pulsed linear frequency modulated noise waveform, comprising the steps of:
generating a Gaussian noise signal with a normally distributed probability density function and that it is wide sense stationary;
sending the Gaussian noise signal to a means for generating a pulse train;
combining said Gaussian noise signal with a linear frequency modulated noise waveform in said pulse train generating means;
generating a pulsed linear frequency modulated fused noise waveform x(t);
sending said pulsed linear frequency modulated fused noise waveform x(t) to a means for sensing targets;
sending a signal from said target sensing means to a target;
generating a range and radar cross section of said target;
detecting a received signal r(t) from said target in a frequency demodulator;
calculating a time dilation effect induced by target scintillation;
generating a time dilated received signal r(t) that consolidates said received signal with said time dilation effect in a frequency demodulator;
sending said time dilated received signal r(t) from said frequency demodulator to a means for correlation mixing;
providing an auto-correlated signal, $R_{yy}(\tau)$, with said correlation mixing means integrating a product over time of said pulsed linear frequency modulated fused noise waveform x(t) and a conjugate of said time dilated received signal r(t);
generating a Fast Fourier Transform of said auto-correlated signal, $R_{yy}(\tau)$; and
converting said auto-correlated signal, $R_{yy}(\tau)$, to a transformed auto-correlated signal, $S_{yy}(f)$, that provides a plurality of discrete frequencies corresponding to said target causing the user to detect said target with a reduced transmit power, without emitting a detectable electronic signature, and without being intercepted.

16. The method for secure target detection with pulsed noise correlation radar and the pulsed linear frequency modulated noise waveform, as recited in claim 15, further comprising the step of realizing a power spectral density that exploits a plurality of time dilation effects induced by target scintillation during said converting step.

17. The method for secure target detection with pulsed noise correlation radar and the pulsed linear frequency modulated noise waveform, as recited in claim 16, further comprising the step of increasing a carrier frequency to realize a plurality of band widths with said pulsed linear frequency modulated fused noise waveform x(t).

18. The method for secure target detection with pulsed noise correlation radar and the pulsed linear frequency modulated noise waveform, as recited in claim 17, wherein:
said pulse generating means is a frequency modulator; and
said target sensing means is a single phase antenna.

19. The method for secure target detection with pulsed noise correlation radar and the pulsed linear frequency modulated noise waveform, as recited in claim 17, wherein:
said pulse generating means is a frequency modulator; and
said target sensing means is a multi-channel antenna array.

20. The method for secure target detection with pulsed noise correlation radar and the pulsed linear frequency modulated noise waveform, as recited in claim 17, further comprising the step of controlling said pulsed noise correlation radar with a means for data processing means and a software program.

21. A pulsed compression noise correlation radar target detection apparatus, comprising:
a wide sense stationary Gaussian noise signal generator generates a Gaussian noise signal and a normally distributed probability density function;
a means for generating a pulse train combines said Gaussian noise signal with a linear frequency modulated noise waveform, generates a pulse train modulating said Gaussian noise signal and provides a pulsed linear frequency modulated fused noise waveform x(t) to a means for sensing targets;

said target sensing means sends a signal to a target and generates a range and radar cross section of targets;

a frequency demodulator detects a received signal r(t) from said target;

said frequency demodulator, having a means for calculations, calculates a time dilation effect induced by target scintillation and generates a time dilated received signal r(t) that includes said time dilation effect;

said frequency demodulator sends said time dilated received signal r(t) to a means for correlation mixing;

said correlation mixing means integrates a product over time of said pulsed linear frequency modulated fused noise waveform x(t) and a conjugate of said time dilated received signal r(t) to provide an auto-correlated signal $R_{yy}(\tau)$;

a Transformer converts said auto-correlated signal $R_{yy}(\tau)$ into a transformed auto-correlated signal, $S_{yy}(f)$, that provides a plurality of discrete frequencies corresponding to said target causing the user to detect said target with a reduced transmit power, without emitting a detectable electronic signature, and without being intercepted.

22. A method for secure target detection with pulsed noise correlation radar and a pulsed linear frequency modulated noise waveform, comprising the steps of:

generating a Gaussian noise signal with a normally distributed probability density function and that it is wide sense stationary;

sending the Gaussian noise signal to a means for generating a pulse train;

combining said Gaussian noise signal with a linear frequency modulated noise waveform in said pulse train generating means;

generating a pulsed linear frequency modulated fused noise waveform x(t);

sending said pulsed linear frequency modulated fused noise waveform x(t) to a means for sensing targets;

sending a signal from said target sensing means to a target;

generating a range and radar cross section of said target;

detecting a received signal r(t) from said target in a frequency demodulator;

calculating a time dilation effect induced by target scintillation;

generating a time dilated received signal r(t) that consolidates said received signal with said time dilation effect in a frequency demodulator;

sending said time dilated received signal r(t) from said frequency demodulator to a means for correlation mixing;

providing an auto-correlated signal, $R_{yy}(\tau)$, with said correlation mixing means integrating a product over time of said pulsed linear frequency modulated fused noise waveform x(t) and a conjugate of said time dilated received signal r(t);

generating a Transform of said auto-correlated signal, $R_{yy}(\tau)$; and converting said auto-correlated signal, $R_{yy}(\tau)$, to a transformed auto-correlated signal, $S_{yy}(f)$, that provides a plurality of discrete frequencies corresponding to said target causing the user to detect said target with a reduced transmit power, without emitting a detectable electronic signature, and without being intercepted.

* * * * *